US010927917B2

United States Patent
Yamashita et al.

(10) Patent No.: US 10,927,917 B2
(45) Date of Patent: Feb. 23, 2021

(54) SHOCK ABSORBER

(71) Applicant: HITACHI AUTOMOTIVE SYSTEMS, LTD., Hitachinaka (JP)

(72) Inventors: Mikio Yamashita, Zama (JP); Kunio Takiguchi, Yokohama (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 15/512,924

(22) PCT Filed: Aug. 25, 2015

(86) PCT No.: PCT/JP2015/073817
§ 371 (c)(1),
(2) Date: Mar. 21, 2017

(87) PCT Pub. No.: WO2016/067724
PCT Pub. Date: May 6, 2016

(65) Prior Publication Data
US 2017/0307044 A1    Oct. 26, 2017

(30) Foreign Application Priority Data

Oct. 31, 2014  (JP) .............................. JP2014-223501

(51) Int. Cl.
*F16F 9/342* (2006.01)
*F16F 9/18* (2006.01)
(Continued)

(52) U.S. Cl.
CPC .............. *F16F 9/342* (2013.01); *F16F 9/185* (2013.01); *F16F 9/3221* (2013.01);
(Continued)

(58) Field of Classification Search
CPC .. F16F 9/342; F16F 9/486; F16F 9/348; F16F 9/44; F16F 9/3221; F16F 9/3257; F16F 2230/18

See application file for complete search history.

(56) References Cited

U.S. PATENT DOCUMENTS

| 5,810,128 A * | 9/1998 | Eriksson ................. F16F 9/342 188/285 |
| 2012/0160620 A1* | 6/2012 | Yamashita ............. B60G 13/08 188/266.5 |
| 2014/0252735 A1* | 9/2014 | Yamashita ............. F16F 9/342 280/6.157 |

FOREIGN PATENT DOCUMENTS

| JP | 56-113250 | 9/1981 |
| JP | 62-123042 | 8/1987 |

(Continued)

OTHER PUBLICATIONS

International Search Report for PCT/JP2015/073817 dated Oct. 6, 2015, 4 pages.

(Continued)

*Primary Examiner* — Xuan Lan Nguyen
(74) *Attorney, Agent, or Firm* — Mattingly & Malur, PC

(57) ABSTRACT

Provided is a shock absorber that includes a middle chamber formed by a piston, a first damping-force generating device that is provided between an upper chamber and the middle chamber and generates a damping force, a second damping-force generating device that is provided between a lower chamber and the middle chamber and generates a damping force, and a position-based state changing device that changes a state of a passage to a state in which the upper chamber and the lower chamber communicate with each other, a state in which the upper chamber and the middle chamber communicate with each other, or a state in which (Continued)

the lower chamber and the middle chamber communicate with each other depending on a position of the piston.

5 Claims, 12 Drawing Sheets

(51) Int. Cl.
- *F16F 9/348* (2006.01)
- *F16F 9/32* (2006.01)
- *F16F 9/44* (2006.01)
- *F16F 9/48* (2006.01)

(52) U.S. Cl.
CPC ............ *F16F 9/3257* (2013.01); *F16F 9/348* (2013.01); *F16F 9/3485* (2013.01); *F16F 9/44* (2013.01); *F16F 9/486* (2013.01); *F16F 2230/18* (2013.01)

(56) References Cited

FOREIGN PATENT DOCUMENTS

| | | |
|---|---|---|
| JP | 2-168038 | 6/1990 |
| JP | 02-195038 | 8/1990 |

OTHER PUBLICATIONS

Written Opinion for PCT/JP2015/073817 dated Oct. 6, 2015, 5 pages.

\* cited by examiner

SHOCK ABSORBER

This application is the U.S. national phase of International Application No. PCT/JP2015/073817 filed on Aug. 25, 2015 which designated the U.S. and claims priority to Japanese Patent Application No. 2014-223501 filed on Oct. 31, 2014, the entire contents of which are hereby incorporated by reference.

TECHNICAL FIELD

The present invention relates to a shock absorber.
Priority is claimed on Japanese Patent Application No. 2014-223501 filed on Oct. 31, 2014, the content of which is incorporated herein by reference.

BACKGROUND ART

There is a shock absorber in which a damping force is switched depending on a piston position (for example, see Patent Literature 1).

CITATION LIST

Patent Literature

[Patent Literature 1]
Japanese Unexamined Patent Application, First Publication No. H02-168038

SUMMARY OF INVENTION

Technical Problem

It is desired to enhance a degree of freedom in setting a damping force.
The present invention provides a shock absorber capable of enhancing a degree of freedom in setting a damping force.

Solution to Problem

According to a first aspect of the present invention, a shock absorber includes a cylinder in which a working fluid is encapsulated; a piston provided in an inside of the cylinder and configured to divide the inside of the cylinder into an upper chamber and a lower chamber; and a piston rod connected to the pistons and configured to extend outside the cylinder. This shock absorber includes: a middle chamber formed by the piston; a first damping-force generating device provided between the upper chamber and the middle chamber and configured to generate a damping force; a second damping-force generating device provided between the lower chamber and the middle chamber and configured to generate a damping force; and a position-based state changing device configured to change a state of a passage to a state in which the upper chamber and the lower chamber communicate with each other, a state in which the upper chamber and the middle chamber communicate with each other, or a state in which the lower chamber and the middle chamber communicate with each other depending on a position of the piston.

According to a second aspect of the present invention, a shock absorber includes: a cylinder in which a working fluid is encapsulated; first and second pistons, at least one of which is slidably provided in an inside of the cylinder, and which divide the inside of the cylinder into an upper chamber, a middle chamber, and a lower chamber; a piston rod connected to the first and second pistons and configured to extend outside the cylinder; a first passage provided in the first and second pistons and configured to communicate between the upper chamber and the middle chamber and between the middle chamber and the lower chamber such that the working fluid flows; an extension-side damping valve provided on the first and second pistons, configured to restrict a flow of the working fluid flowing along the first passage by movement of the first and second pistons, and configured to generate a damping force; a compression-side damping valve provided on the first and second pistons, configured to restrict a flow of the working fluid flowing along the first passage by movement of the first and second pistons, and configured to generate a damping force; a second passage configured to allow the upper chamber, the middle chamber, and the lower chamber to communicate therethrough in addition to the first passage; a first adjustment section provided on the second passage and configured to adjust a flow passage area of the working fluid between the upper chamber and the middle chamber depending on positions of the first and second pistons; and a second adjustment section that is provided on the second passage and configured to adjust a flow passage area of the working fluid between the lower chamber and the middle chamber depending on the positions of the first and second pistons. The flow passage areas of the first and second adjustment sections are set such that: the flow passage area of the first adjustment section and the flow passage area of the second adjustment section are increased together when the first piston and the second piston are within a first predetermined range including a neutral position; the flow passage area of the first adjustment section is reduced, and the flow passage area of the second adjustment section is increased when the first piston and the second piston exceed the first predetermined range and are within a second predetermined range at a maximum length side; and the flow passage area of the first adjustment section is increased, and the flow passage area of the second adjustment section is reduced when the first piston and the second piston exceed the first predetermined range and are within a third predetermined range at a minimum length side.

According to a third aspect of the present invention, the extension-side damping valve of the first piston and the extension-side damping valve of the second piston may be set such that, when the first piston and the second piston move in an extending direction, the damping force generated by the extension-side damping valve located upstream is smaller than the damping force generated by the extension-side damping valve located downstream. The compression-side damping valve of the first piston and the compression-side damping valve of the second piston may be set such that, when the first piston and the second piston move in a compressing direction, the damping force generated by the compression-side damping valve located upstream is smaller than the damping force generated by the compression-side damping valve located downstream.

According to a fourth aspect of the present invention, in at least one of a case in which the first piston and the second piston exceed the second predetermined range and are located at the maximum length side and a case in which the first piston and the second piston exceed the third predetermined range and are located at the minimum length side, the flow passage area of the first adjustment section and the flow passage area of the second adjustment section may be set to be reduced together.

According to a fifth aspect of the present invention, the flow passage area of the first adjustment section and the flow passage area of the second adjustment section may be adjusted by a metering pin. The metering pin may have a reduced diameter section that extends to be longer than an axial length between the first adjustment section and the second adjustment section, and regulate the first predetermined range.

According to a sixth aspect of the present invention, the flow passage areas of the first and second adjustment sections may be adjusted by an axial groove that is partly formed on an inner circumference of the cylinder. The axial groove may extend to be longer than an axial length between the first adjustment section and the second adjustment section, and regulate the first predetermined range.

Advantageous Effects of Invention

According to the shock absorber, a degree of freedom in setting a damping force can be enhanced.

BRIEF DESCRIPTION OF DRAWINGS

FIG. 5 is a diagram illustrating characteristics of the shock absorber of the first embodiment according to the present invention, wherein FIG. 5(a) illustrates an area of a variable orifice to stroke positions of pistons, and FIG. 5(b) illustrates a damping force to stroke positions of pistons.

FIG. 9 is a characteristic diagram illustrating results of simulation of a yaw rate at the time of double lane change of the vehicle on which the shock absorber of the first embodiment according to the present invention is mounted, wherein FIG. 9(b) is an enlarged view of part B of FIG. 9(a).

DESCRIPTION OF EMBODIMENTS

First Embodiment

Figure 1:
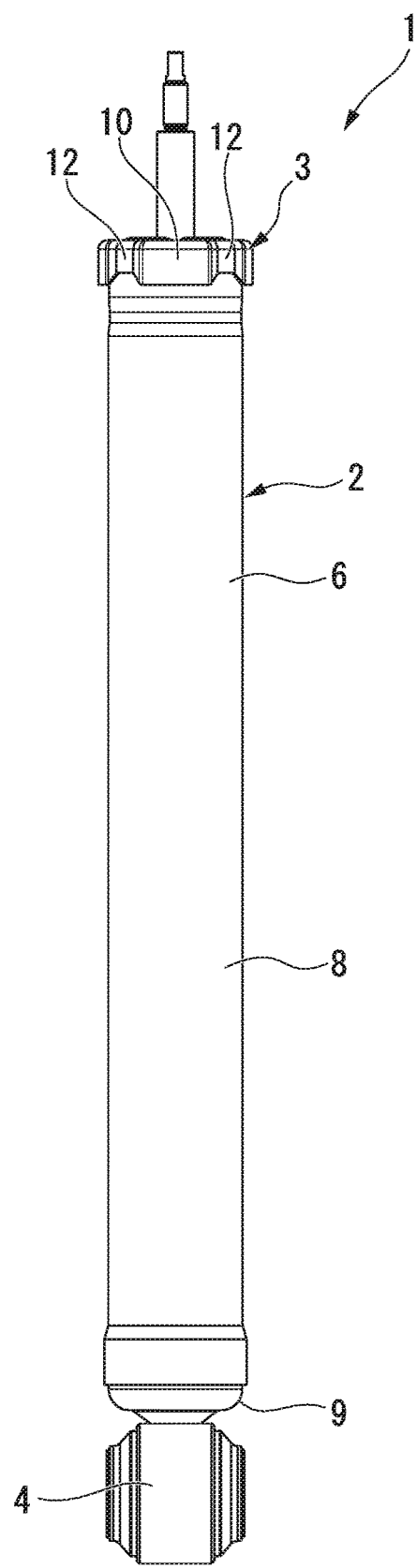
FIG. 1 is a front view illustrating a shock absorber of a first embodiment according to the present invention.

A first embodiment according to the present invention will be described with reference to the drawings. To facilitate understanding in the following description, a lower side in the drawings is defined as a "lower side," and an upper side in the drawings is conversely defined as an "upper side."

Figure 2:
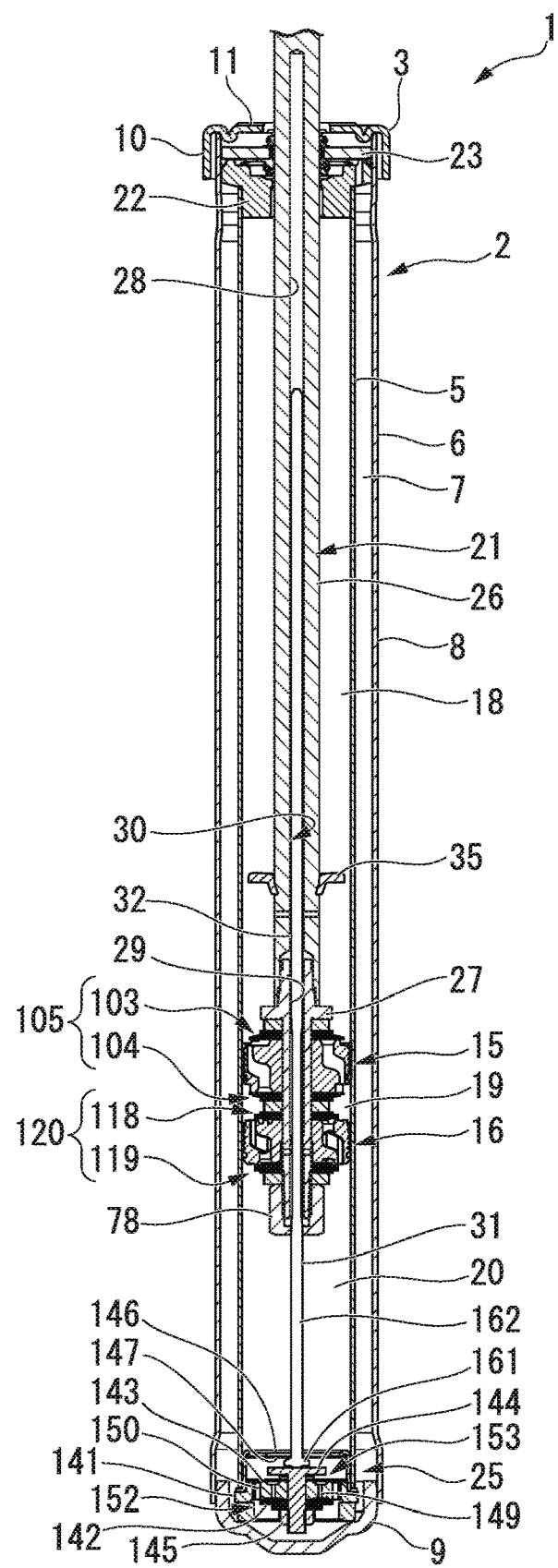
FIG. 2 is a sectional view illustrating the shock absorber of the first embodiment according to the present invention.

A shock absorber 1 of the first embodiment illustrated in FIG. 1 is a position-sensitive adjustable damping force shock absorber. The shock absorber 1 has a cylinder 2 in which oil acting as a working fluid is encapsulated, a cover 3 that covers a first end section of the cylinder 2, and a mounting eye 4 that is fixed to a second end section of the cylinder 2. As illustrated in FIG. 2, the shock absorber 1 is a so-called double cylinder hydraulic shock absorber. The cylinder 2 has a cylindrical inner cylinder 5 and a cylindrically bottomed outer cylinder 6 that has a larger diameter than the inner cylinder 5 and is concentrically provided to cover the inner cylinder 5. A reservoir chamber 7 is defined between the inner cylinder 5 and the outer cylinder 6.

The outer cylinder 6 is made up of a substantially cylindrical trunk member 8 and a bottom member 9 that is fixedly fitted to a lower portion, which is a first end section, of the trunk member 8 and blocks a lower-end opening of the trunk member 8. As illustrated in FIG. 1, the mounting eye 4 is mounted on a side of the bottom member 9 which is opposite to the trunk member 8.

As illustrated in FIG. 2, the cover 3 covers an upper opening of the outer cylinder 6. The cover 3 has a tubular section 10 and an inner flange section 11 that extends inward from an upper end of the tubular section 10 in a radial direction. The cover 3 is put on an upper-end opening of the trunk member 8 which is on a side opposite to the bottom member 9. As illustrated in FIG. 1, a plurality of concave sections 12 are formed at the cover 3 to protrude in the radial direction at intervals in a circumferential direction of the tubular section 10. The upper-end opening of the trunk member 8 is fixedly fitted into the concave sections 12.

As illustrated in FIG. 2, two pistons, a first piston 15 and a second piston 16 closer to the bottom member 9 than the first piston, are slidably fitted into the inner cylinder 5. The first piston 15 and the second piston 16 installed inside the inner cylinder 5 divide the inside of the inner cylinder 5 into three chambers, an upper chamber 18 on a side of the first piston 15 opposite to the second piston 16, a middle chamber 19 between the first piston 15 and the second piston 16, and a lower chamber 20 on a side of the second piston 16 opposite to the first piston 15. In other words, the upper chamber 18 is defined in the inner cylinder 5 by the first piston 15, the middle chamber 19 is defined in the inner cylinder 5 by the first piston 15 and the second piston 16, and the lower chamber 20 is defined in the inner cylinder 5 by the second piston 16. Oil acting as a working fluid is encapsulated in each of the upper chamber 18, the middle chamber 19, and the lower chamber 20 in the inner cylinder 5. Oil and gas acting as working fluids are encapsulated in the reservoir chamber 7 between the inner cylinder 5 and the outer cylinder 6.

A first end section of a piston rod 21 is inserted into the cylinder 2. A second end section of the piston rod 21 extends outside the cylinder 2. The first piston 15 and the second piston 16 are connected to the first end section of the piston rod 21 in the cylinder 2. The first piston 15 and the second piston 16 are moved integrally with the piston rod 21. As a result, the middle chamber 19 between the first piston 15 and the second piston 16 in the inner cylinder 5 are also moved integrally with the piston rod 21.

A rod guide 22 is fitted to one-end openings of the inner cylinder 5 and the outer cylinder 6. A seal member 23 is mounted on the outer cylinder 6 on the outside of the cylinder 2 beyond the rod guide 22. Both the rod guide 22 and the seal member 23 have annular shapes. The piston rod 21 is slidably inserted into the rod guide 22 and the seal member 23 and extends outside the cylinder 2.

The rod guide 22 movably supports the piston rod 21 in an axial direction while regulating movement of the piston rod 21 in the radial direction and guides the movement of the piston rod 21. An inner circumferential portion of the seal member 23 is in slideable contact with an outer circumferential portion of the piston rod 21 moving in the axial direction. An outer circumferential portion of the seal member 23 is closely attached to an inner circumferential portion of the outer cylinder 6. The seal member 23 prevents the oil inside the inner cylinder 5 and a high-pressure gas and the oil of the reservoir chamber 7 inside the outer cylinder 6 from leaking to the outside.

The rod guide 22 has a stepped shape in which an upper portion of an outer circumferential portion of the rod guide 22 has a larger diameter than a lower portion of the outer circumferential portion of the rod guide 22. A lower portion of the rod guide 22 is fitted to an inner circumferential portion of an upper end of the inner cylinder 5, and an upper portion of the rod guide 22 is fitted to an inner circumferential portion of an upper end of the outer cylinder 6. A base valve 25 defining the lower chamber 20 and the reservoir chamber 7 in the inner cylinder 5 is installed above the bottom member 9 of the outer cylinder 6. An inner circumferential portion of a lower end of the inner cylinder 5 is fitted to the base valve 25. The upper chamber 18 is provided between the rod guide 22 and the first piston 15. The lower chamber 20 is provided between the second piston 16 and the base valve 25.

The piston rod 21 has a rod main body 26 that is inserted into the rod guide 22 and the seal member 23 and extends to the outside, and a tip rod 27 that is screwed onto an end section of the rod main body 26 inside the cylinder 2 and is integrally connected to the rod main body 26. An insertion hole 28 running in then axial direction is formed in the center of the rod main body 26 in the radial direction from the tip rod 27 to a midway position around an end section of the rod main body 26, which is on a side opposite to the tip rod 27. A penetration hole 29 running in the axial direction is formed in the center of the tip rod 27 in the radial direction. The insertion hole 28 and the penetration hole 29 constitute an insertion hole 30 formed in the center of the piston rod 21 in the radial direction. Therefore, the piston rod 21 has a hollow structure. A metering pin 31 is inserted into the insertion hole 30 of the piston rod 21. A first end section of the metering pin 31 is fixed to the base valve 25, which is provided closer to the bottom member 9 of the cylinder 2 than the metering pin 31. A second end section of the metering pin 31 is inserted into the insertion hole 30 of the piston rod 21. A space between the insertion hole 30 and the metering pin 31 forms an intra-rod passage (a second passage) 32 along which oil can flow in the piston rod 21.

An annular stopper 35 is mounted on an outer circumference of the rod main body 26 of the piston rod 21 near the tip rod 27 in the axial direction. The stopper 35 comes into contact with the rod guide 22 at a full extension position thereof at which the piston rod 21 maximally protrudes from the cylinder 2, and regulates protrusion of the piston rod 21 exceeding the full extension position.

The shock absorber 1 is used in a suspension system of a vehicle such as an automobile or a railroad vehicle. For example, a first end section of the shock absorber 1 is supported by a vehicle body, and a second end section of the shock absorber 1 is connected to a wheel section. To be specific, the shock absorber 1 is connected to the vehicle body by the piston rod 21, and the mounting eye 4 that is illustrated in FIG. 1 on a side opposite to a protruding side of the piston rod 21 of the cylinder 2 is connected to the wheel section. Conversely, the second end section of the shock absorber 1 may be supported by the vehicle body, and the first end section of the shock absorber 1 may be connected to the wheel section. In the shock absorber 1, when the vehicle body is moved up relative to a wheel, the piston rod 21 protrudes from the cylinder 2. Conversely, when the vehicle body is moved down relative to the wheel, the piston rod 21 enters the cylinder 2. A direction in which the piston rod 21 protrudes from the cylinder 2 may be referred to as an "extension side" and a "maximum length side." A direction in which the piston rod 21 enters the cylinder 2 may be referred to as a "compression side" and a "minimum length side."

When the wheel vibrates during traveling, positions of the cylinder 2 and the piston rod 21 vary relatively along with the vibration. This variation is suppressed by fluid resistance of the intra-rod passage 32 formed in the piston rod 21. As will be described below, the fluid resistance of the intra-rod passage 32 formed in the piston rod 21 is made different depending on a speed or an amplitude of the vibration to suppress the vibration so that riding comfort is improved. In addition to the vibration generated by the wheel, an inertial force or a centrifugal force occurring at the vehicle body during the traveling of the vehicle also acts between the cylinder 2 and the piston rod 21. For example, as a traveling direction is changed by operating a steering wheel, a centrifugal force occurs at the vehicle body and a force based on the centrifugal force acts between the cylinder 2 and the piston rod 21. As will be described below, the shock absorber 1 of the present embodiment has an excellent characteristic with respect to vibration based on a force occurring at the vehicle body during the traveling of the vehicle, and obtains high stability during the traveling of the vehicle.

Figure 3:
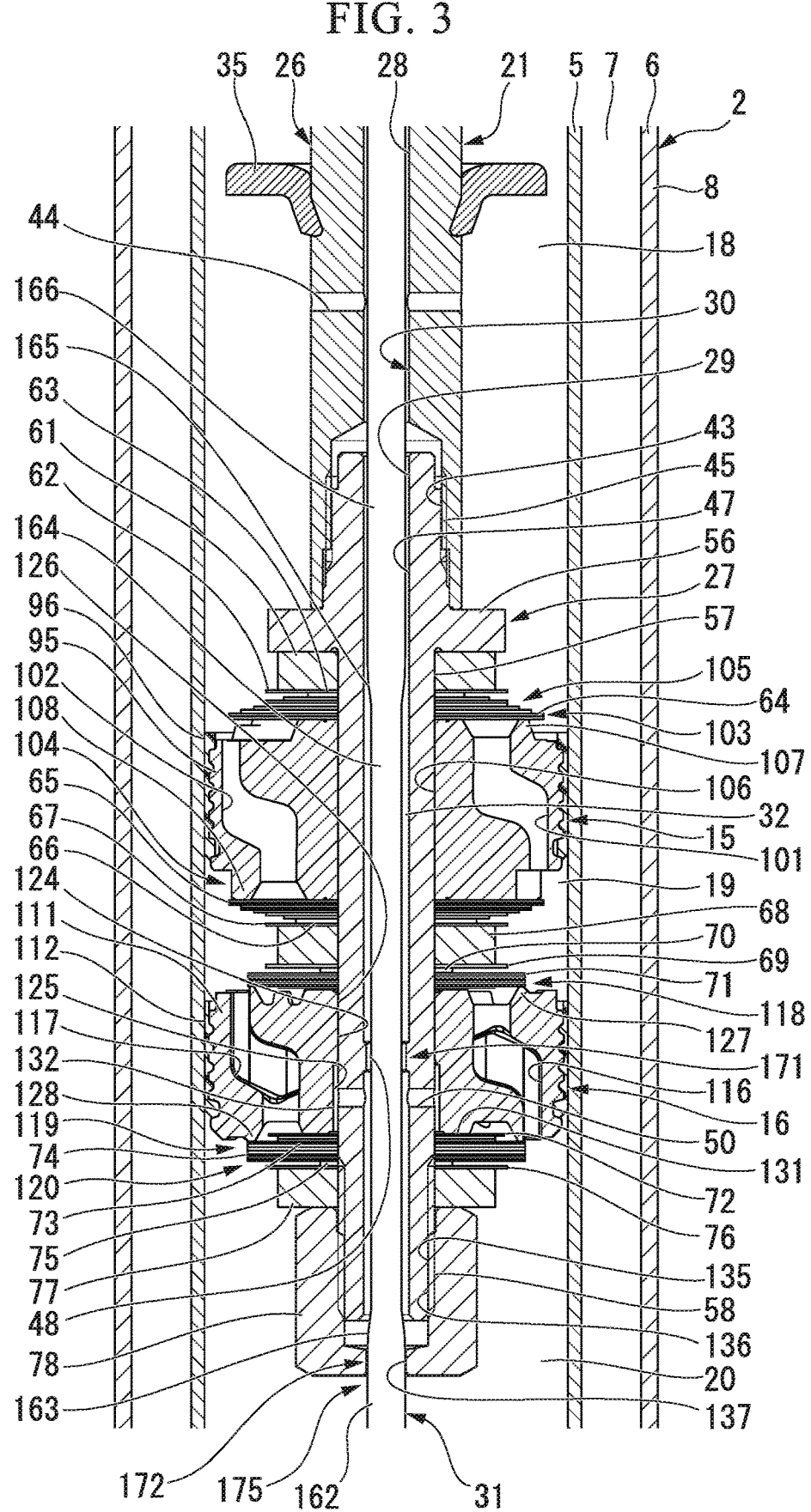
FIG. 3 is a partially enlarged sectional view illustrating main sections of the shock absorber of the first embodiment according to the present invention.

As illustrated in FIG. 3, a screw hole 43 having a larger diameter than the insertion hole 28 is formed in an end section of the rod main body 26 which is close to the tip rod 27. A passage hole 44, which is orthogonal to the insertion hole 28 and passes through the rod main body 26 in the radial direction, is formed near the screw hole 43 of the rod main body 26. The passage hole 44 also constitutes the intra-rod passage 32 along with the insertion hole 28. The passage hole 44 is formed between the stopper 35 and the tip rod 27 in the rod main body 26.

A screw shaft section 45 is formed at a first end section of the tip rod 27. The screw shaft section 45 is screwed into the screw hole 43 of the rod main body 26 to integrally connect the tip rod 27 to the rod main body 26. The penetration hole 29 formed in the intra-rod passage 32 of the tip rod 27 is made up of a main hole section 47 that constitutes almost the entirety of the penetration hole 29, and a small diameter hole section 48 that is formed at an intermediate portion of the main hole section 47 which is on a side opposite to the screw shaft section 45 in the axial direction and has a smaller diameter than the main hole section 47. A passage hole 50 which is orthogonal to the penetration hole 29 and passes through the tip rod 27 in the radial direction is formed in the tip rod 27 at a position on a side of the small diameter hole section 48 opposite to the screw shaft section 45 at the main hole section 47. The passage hole 50 also constitutes the intra-rod passage 32.

The tip rod 27 has the screw shaft section 45, a flange section 56, and a holding shaft section 57 in order from the rod main body 26 side in the axial direction. An outer diameter of the flange section 56 is larger than an outer diameter of the screw shaft section 45 and an outer diameter of the rod main body 26. As described above, the tip rod 27 is screwed into the screw hole 43 of the rod main body 26 at the screw shaft section 45. On this occasion, the flange section 56 comes into contact with the rod main body 26. The holding shaft section 57 has a smaller diameter than the flange section 56. A male screw 58 is formed at a portion of the holding shaft section 57 on a side opposite to the flange section 56 in the axial direction. The passage hole 50 is formed between the male screw 58 of the holding shaft section 57 and the flange section 56.

One regulating member 61, one abutting disc 62, one disc 63, a disc valve 64 made up of a plurality of discs, the first piston 15, a disc valve 65 made up of a plurality of discs, one disc 66, one abutting disc 67, one regulating member 68, one abutting disc 69, one disc 70, a disc valve 71 made up of a plurality of discs, the second piston 16, one passage forming disc 72, a plurality of discs 73, a disc valve 74 made up of a plurality of discs, one disc 75, one abutting disc 76, and one regulating member 77 are sequentially arranged at the holding shaft section 57 of the tip rod 27 from the flange section 56 side and are sandwiched by the flange section 56 and a nut 78 screwed to the male screw 58.

The first piston 15 is constituted of a piston main body 95 that is supported by the tip rod 27 and is formed of a metal, and a sliding member 96 that is mounted on an outer circumferential surface of the piston main body 95, slides in the inner cylinder 5, and is formed of a synthetic resin in an annular shape.

The piston main body 95 includes a plurality of passages (first passages) 101 (only one of which is shown because FIG. 3 is a sectional view) which allows the upper chamber 18 and the middle chamber 19 to communicate with each other and out of which oil flows from the middle chamber 19 toward the upper chamber 18 in a process of a movement of the first piston 15 toward the middle chamber 19 side, that is in a compression stroke, and a plurality of passages (first passages) 102 (only one of which is shown because FIG. 3 is a sectional view) out of which oil flows from the upper chamber 18 toward the middle chamber 19 in a process of a movement of the first piston 15 toward the upper chamber 18 side, that is in an extension stroke. That is, the plurality of passages 101 and the plurality of passages 102 are provided on the first piston 15 and allow the upper chamber 18 and the middle chamber 19 to communicate with each other such that the oil, which is the working fluid, flows between the upper chamber 18 and the middle chamber 19 depending on the movement of the first piston 15.

The passages 101 are formed at equal pitches in the circumferential direction with one passage 102 sandwiched between two neighboring passages 101. First end sections (the lower side of FIG. 3) of the passages 101 in the axial direction of the first piston 15 are open to the outside in the radial direction. Second end sections (the upper side of FIG. 3) of the passages 101 in the axial direction of the first piston 15 are open to the inside in the radial direction. The disc valve 64 is provided on half of the passages 101 and 102, particularly the passages 101. The disc valve 64 is disposed close to the upper chamber 18, which is at the second end section of the first piston 15 in the axial direction. The passages 101 constitute a compression-side passage through which oil flows when the first piston 15 is moved toward the compression side at which the piston rod 21 enters the cylinder 2. The disc valve 64 provided on the passages 101 constitutes a compression-side damping valve 103 that restricts a flow of oil of the compression-side passages 101 to generate a damping force.

The passages 102 corresponding to the remaining half of the passages 101 and 102 are formed at equal pitches in the circumferential direction with one passage 101 sandwiched between two neighboring passages 102. Second end sections (the upper side of FIG. 3) of the passages 102 in the axial direction of the first piston 15 are open to the outside in the radial direction. First end sections (the lower side of FIG. 3) of the passages 102 in the axial direction of the first piston 15 are open to the inside in the radial direction. The disc valve 65 is provided on the passages 102 corresponding to the remaining half of the passages 101 and 102. The disc valve 65 is disposed near the middle chamber 19, which is at the first end section of the first piston 15 in the axial direction, in a direction of an axis. The passages 102 constitute an extension-side passage through which oil flows when the first piston 15 is moved toward the extension side at which the piston rod 21 extends outside the cylinder 2. The disc valve 65 provided on the passages 102 constitutes an extension-side damping valve 104 that restricts a flow of oil of the extension-side passages 102 to generate a damping force.

The compression-side damping valve 103 including the disc valve 64 and the extension-side damping valve 104 including the disc valve 65 constitute a first damping-force generating device 105 that is provided between the upper chamber 18 and the middle chamber 19 and generates a damping force.

The piston main body 95 of the first piston 15 has a substantially disc shape. An insertion hole 106, which penetrates into the piston main body 95 in the axial direction so that the holding shaft section 57 of the tip rod 27 is inserted therein, is formed in the center of the piston main body 95. A seat section 107 is formed at an end section of the piston main body 95 which is close to the upper chamber 18 in an annular shape beyond positions of one-end openings of the compression-side passages 101. A seat section 108 is formed at an end section of the piston main body 95 which is close to the middle chamber 19 in an annular shape on the outside of positions of one-end openings of the extension-side passages 102.

A portion of the seat section 107 which is on a side opposite to the insertion hole 106 in the piston main body 95 has a stepped shape in which a height is lower than the seat section 107 in the direction of the axis. Second ends of the extension-side passages 102 are open at this step-shaped portion. When an outer circumferential portion of the disc valve 64 is seated on the seat section 107, the disc valve 64 closes the compression-side passages 101 inside the seat section 107. When the outer circumferential portion of the disc valve 64 is separated from the seat section 107, the disc valve 64 opens the passages 101. That is, the disc valve 64 and the seat section 107 constitute the compression-side damping valve 103 that restricts the flow of the oil of the compression-side passages 101 to generate the damping force.

The disc valve 64 is made up of a plurality of discs, each of which is formed of a metal and has a perforated disc shape. One of two discs that overlap each other in the axial direction, which is far from the seat section 107, has an outer diameter that is smaller than or equal to that of the other which is close to the seat section 107. The disc 63 is formed of a metal and has a perforated disc shape. An outer diameter of the disc 63 is smaller than that of the smallest diameter disc that constitutes the disc valve 64. The abutting disc 62 is formed of a metal and has a perforated disc shape. An outer diameter of the abutting disc 62 is larger than that of the smallest diameter disc that constitutes the disc valve 64, and is smaller than that of the largest diameter disc that constitutes the disc valve 64. The regulating member 61 is formed of a metal and has a perforated disc shape, and has higher rigidity than the disc valve 64. An outer diameter of the regulating member 61 is smaller than that of the abutting disc 62, and is smaller than that of the flange section 56. The abutting disc 62 comes into contact with the disc valve 64 when the disc valve 64 is deformed in an opening direction, and regulates deformation of the disc valve 64 which is higher than or equal to a prescribed level along with the regulating member 61.

A side of the seat section 108, which is opposite to the insertion hole 106, in the piston main body 95 has a stepped shape in which a height is lower than the seat section 108 in the direction of the axis. Second ends of the compression-side passages 101 are open at this step-shaped portion. When an outer circumferential portion of the disc valve 65 is seated on the seat section 108, the disc valve 65 closes the extension-side passages 102 inside the seat section 108. When the outer circumferential portion of the disc valve 65 is separated from the seat section 108, the disc valve 65 opens the passages 102. That is, the disc valve 65 and the seat section 108 constitute the extension-side damping valve 104 that restricts the flow of the oil of the extension-side passages 102 to generate the damping force.

The disc valve 65 is made up of a plurality of discs, each of which is formed of a metal and has a perforated disc shape. One of two discs that overlap each other in the axial direction, which is far from the seat section 108, has an outer diameter that is smaller than or equal to that of the other which is close to the seat section 108. The disc 66 is formed of a metal and has a perforated disc shape. An outer diameter of the disc 63 is smaller than that of the smallest diameter disc that constitutes the disc valve 65. The abutting disc 67 is formed of a metal and has a perforated disc shape. An outer diameter of the abutting disc 67 is larger than that of the smallest diameter disc that constitutes the disc valve 65 and is smaller than that of the largest diameter disc that constitutes the disc valve 65. The regulating member 68 is formed of a metal and has a perforated disc shape and has higher rigidity than the disc valve 65. An outer diameter of the regulating member 68 is smaller than that of the abutting disc 67. The abutting disc 67 comes into contact with the disc valve 65 when the disc valve 65 is deformed in an opening direction, and regulates deformation of the disc valve 65 which is higher than or equal to a prescribed level along with the regulating member 68. The disc valve 65 has lower rigidity than the disc valve 64 and is more easily opened than the disc valve 64.

The second piston 16 is made up of a piston main body 111 that is supported by the tip rod 27 and is formed of a metal, and a sliding member 112 that is mounted on an outer circumferential surface of the piston main body 111, slides in the inner cylinder 5, and is formed of a synthetic resin in an annular shape.

The piston main body 111 includes a plurality of passages (first passages) 116 (only one of which is shown because FIG. 3 is a sectional view) which allow the middle chamber 19 and the lower chamber 20 to communicate with each other and out of which oil flows from the lower chamber 20 toward the middle chamber 19 in a process of a movement of the second piston 16 toward the lower chamber 20 side, that is in the compression stroke, and a plurality of passages (first passages) 117 (only one of which is shown because FIG. 3 is a sectional view) out of which oil flows from the middle chamber 19 toward the lower chamber 20 in a process of a movement of the second piston 16 toward the middle chamber 19 side, that is in the extension stroke. That is, the plurality of passages 116 and the plurality of passages 117 are provided on the second piston 16 and allow the middle chamber 19 and the lower chamber 20 to communicate with each other such that the oil, which is the working fluid, flows between the middle chamber 19 and the lower chamber 20 depending on the movement of the second piston 16.

The passages 116 are formed at equal pitches in the circumferential direction with one passage 117 sandwiched between two neighboring passages 116. First end sections (the lower side of FIG. 3) of the passages 116 in the axial direction of the second piston 16 are open to the outside in the radial direction. Second end sections (the upper side of FIG. 3) of the passages 116 in the axial direction of the second piston 16 are open to the inside in the radial direction. The disc valve 71 is provided on half of the passages 116 and 117, particularly the passages 116. The disc valve 71 is disposed near the middle chamber 19, which is at one end of the second piston 16 in the axial direction. The passages 116 constitute a compression-side passage through which oil flows when the second piston 16 is moved toward the compression side at which the piston rod 21 enters the cylinder 2. The disc valve 71 provided on the passages 116 constitutes a compression-side damping valve 118 that restricts a flow of the oil of the compression-side passages 116 to generate a damping force.

The passages 117 corresponding to the remaining half of the passages 116 and 117 are formed at equal pitches in the circumferential direction with one passage 116 sandwiched between two neighboring passages 117. Second end sections (the upper side of FIG. 3) of the passages 117 in the axial direction of the second piston 16 are open to the outside in the radial direction. First end sections (the lower side of FIG. 3) of the passages 117 in the axial direction of the second piston 16 are open to the inside in the radial direction. The disc valve 74 generating a damping force is provided on the passages 117 corresponding to the remaining half of the passages 116 and 117. The disc valve 74 is disposed close to the lower chamber 20, which is at the first end section of the second piston 16 in the axial direction, in the direction of the axis. The passages 117 constitute an extension-side passage through which oil flows when the second piston 16 is moved toward the extension side at which the piston rod 21 extends outside the cylinder 2. The disc valve 74 provided with respect to the passages 117 constitutes an extension-side damping valve 119 that restricts a flow of the oil of the extension-side passages 117 to generate a damping force.

The compression-side damping valve 118 including the disc valve 71 and the extension-side damping valve 119 including the disc valve 74 constitute a second damping-force generating device 120 that is provided between the middle chamber 19 and the lower chamber 20 and generates a damping force.

The piston main body 111 of the second piston 16 has a substantially disc shape. An insertion hole 126, which penetrates into the piston main body 111 in the axial direction so that the holding shaft section 57 of the tip rod 27 is inserted therein, is formed in the center of the piston main body 111. The insertion hole 126 is made up of a fitting hole section 124 that the holding shaft section 57 fits into and is close to the middle chamber 19, and a passage forming hole section 125 that has a larger diameter than the fitting hole section 124 and is close to the lower chamber 20. A gap between the passage forming hole section 125 and the holding shaft section 57 communicates with the passage hole 50 of the tip rod 27. A seat section 127 is formed at an end section of the piston main body 111 which is close to the middle chamber 19 in an annular shape beyond positions of one-end openings of the compression-side passages 116. A seat section 128 is formed at an end section of the piston main body 111 which is close to the lower chamber 20 in an annular shape on the outside of positions of one-end openings of the extension-side passages 117.

A side of the seat section 127, which is opposite to the insertion hole 126, in the piston main body 111 has a stepped shape in which a height is lower than the seat section 127 in the direction of the axis. Second ends of the extension-side passages 117 are open at this step-shaped portion. When an outer circumferential portion of the disc valve 71 is seated on the seat section 127, the disc valve 71 closes the compression-side passages 116 inside the seat section 127. When the outer circumferential portion of the disc valve 71 is separated from the seat section 127, the disc valve 71 opens the passages 116. That is, the disc valve 71 and the seat section 127 constitute the compression-side damping valve 118 that restricts the flow of the oil of the compression-side passages 116 to generate the damping force.

The disc valve 71 is made up of a plurality of discs, each of which is formed of a metal and has a perforated disc shape. These discs have the same outer diameters. The disc 70 is formed of a metal and has a perforated disc shape. An outer diameter of the disc 70 is smaller than that of the disc valve 71. The abutting disc 69 is formed of a metal and has a perforated disc shape. An outer diameter of the abutting disc 69 is smaller than that of the disc valve 71 and is larger than that of the regulating member 68. The abutting disc 69 comes into contact with the disc valve 71 when the disc valve 71 is deformed in an opening direction, and regulates deformation of the disc valve 71 which is greater than or equal to a prescribed level along with the regulating member 68.

A side of the seat section 128, which is opposite to the insertion hole 106, in the piston main body 111 has a stepped shape in which a height is lower than the seat section 128 in the direction of the axis. Second ends of the compression-side passages 116 are open at this step-shaped portion. When an outer circumferential portion of the disc valve 74 is seated on the seat section 128, the disc valve 74 closes the extension-side passages 117 inside the seat section 128. When the outer circumferential portion of the disc valve 74 is separated from the seat section 128, the disc valve 74 opens the passages 117. That is, the disc valve 74 and the seat section 128 constitute the extension-side damping valve 119 that restricts the flow of the oil of the extension-side passages 117 to generate the damping force.

The disc valve 74 is made up of a plurality of discs, each of which is formed of a metal and has a perforated disc shape. These discs have the same outer diameters. The discs 73 are formed of a metal. The discs 73 have perforated disc shapes. An outer diameter of each of the discs 73 is smaller than that of the disc valve 74. The passage forming disc 72 is formed of a metal. The passage forming disc 72 has a perforated disc shape. An outer diameter of the passage forming disc 72 is larger than that of each of the discs 73 and is smaller than that of the disc valve 74. A passage groove 131 is formed in the passage forming disc 72. The passages 117 and the inside of the passage forming hole section 125 communicate with each other due to the passage groove 131. Accordingly, the passages 117 communicate with the intra-rod passage 32 in the passage hole 50. The passage groove 131 and the inside of the passage forming hole section 125 constitute a communication passage (a second passage) 132 that allows the passages 117 and the intra-rod passage 32 to communicate with each other at normal times.

The disc 75 is formed of a metal. The disc 75 has a perforated disc shape. An outer diameter of the disc 75 is smaller than that of the disc valve 74. The disc 76 is formed of a metal. The disc 76 has a perforated disc shape. An outer diameter of the disc 76 is smaller than that of the disc valve 74 and is larger than that of the disc 75. The regulating member 77 is formed of a metal. The regulating member 77 has a perforated disc shape and has higher rigidity than the disc valve 74. An outer diameter of the regulating member 77 is smaller than that of the disc 76. The disc 76 comes into contact with the disc valve 74 when the disc valve 74 is deformed in an opening direction, and regulates deformation of the disc valve 74 which is higher than or equal to a prescribed level along with the regulating member 77. The disc valve 74 has lower rigidity than the disc valve 71 and is more difficult to open than the disc valve 71.

The passages 101 and 102 provided on the first piston 15 and the passages 116 and 117 provided on the second piston 16 allow the upper chamber 18 and the middle chamber 19 to communicate with each other and the middle chamber 19 and the lower chamber 20 to communicate with each other such that the oil, which is the working fluid, flows between the upper chamber 18 and the middle chamber 19 and between the middle chamber 19 and the lower chamber 20.

The extension-side damping valves 104 and 119 are provided on the first and second pistons 15 and 16, and restrict the flow of the oil flowing along the passages 102 and 117 to generate a damping force due to the movement of the first and second pistons 15 and 16 in an extending direction. In the extension stroke, the passages 102 are upstream (that is, the upper chamber 18 side) from the flow of the oil, and the passages 117 are downstream (that is, the lower chamber 20 side). In the extension stroke, the extension-side damping valve 104 of the extension-side damping valves 104 and 119 is upstream (that is, the upper chamber 18 side), and the extension-side damping valve 119 is downstream (that is, the lower chamber 20 side).

The disc valves 65 and 74 are configured such that the disc valve 65 of the first piston 15 has lower rigidity than the disc valve 74 of the second piston 16 and is more easily opened than the disc valve 74 of the second piston 16. As a result, the disc valves 65 and 74 are configured such that the damping force generated by the disc valve 65 located upstream from the flow of the oil in the extension stroke in which the first piston 15 and the second piston 16 are moved in the extending direction is set to be weaker and softer than that generated by the disc valve 74 located downstream.

The compression-side damping valves 103 and 118 are provided on the first and second pistons 15 and 16 and restrict the flow of the oil flowing along the passages 101 and 116 to generate a damping force due to the movement of the first and second pistons 15 and 16 in a compressing direction. In the compression stroke, the passages 116 are upstream (that is, the lower chamber 20 side) from the flow of the oil, and the passages 101 are downstream (that is, the upper chamber 18 side). In the compression stroke, the compression-side damping valve 118 of the compression-side damping valves 103 and 118 is upstream (that is, the lower chamber 20 side), and the compression-side damping valve 103 is downstream (that is, the upper chamber 18 side).

The disc valves 64 and 71 are configured such that the disc valve 64 of the first piston 15 has higher rigidity than the disc valve 71 of the second piston 16 and is more difficult to open than the disc valve 71 of the second piston 16. As a result, the compression-side damping valves 103 and 118 are configured such that the damping force generated by the compression-side damping valve 118 located upstream from the flow of the oil in the compression stroke in which the first piston 15 and the second piston 16 are moved in the compressing direction is set to be weaker and softer than that generated by the compression-side damping valve 103 located downstream.

A screw hole section 136, in which a female screw 135 screwed onto the male screw 58 of the tip rod 27 is formed, and a small diameter hole section 137, which has a smaller diameter than the screw hole section 136, are formed at the nut 78. The nut 78 constitutes the piston rod 21 along with the rod main body 26 and the tip rod 27. The inside of the nut 78 constitutes the intra-rod passage 32. The metering pin 31 is inserted inside the small diameter hole section 137 of the nut 78. The small diameter hole section 137 also constitutes the insertion hole 30 into which the metering pin 31 is inserted. An inner diameter of the small diameter hole section 137 is identical to that of the small diameter hole section 48. The small diameter hole section 137 is formed at an end section of the intra-rod passage 32.

In a state in which the nut 78 is fastened to the tip rod 27, an inner circumferential portion of the disc valve 64 is clamped by the disc 63 and the first piston 15. An inner circumferential portion of the disc valve 65 is clamped by the disc 66 and the first piston 15. An inner circumferential portion of the disc valve 71 is clamped by the disc 70 and the second piston 16. An inner circumferential portion of the disc valve 74 is clamped by the disc 75 and the discs 73. Thereby, an outer circumferential portion of each of the disc valves 64, 65, 71, and 74 can be deformed.

As illustrated in FIG. 1, the base valve 25 is provided between the bottom member 9 of the outer cylinder 6 and the inner cylinder 5. The base valve 25 has a base valve member 141 that partitions the lower chamber 20 and the reservoir chamber 7, a disc 142 that is provided a lower side of the base valve member 141, that is, close to the reservoir chamber 7, a disc 143 that is provided an upper side of the base valve member 14, that is, close to the lower chamber 20, a bolt member 144 that mounts the disc 142 on the base valve member 141, a nut member 145 that mounts the disc 143 on the base valve member 141, a locking member 146 that is mounted on an outer circumferential portion of the base valve member 141, and a support plate 147 that supports a support flange section 161 (to be described below) of the metering pin 31. The bolt member 144 and the nut member 145 sandwich central portions of the disc 142 and the disc 143 in the radial direction along with the base valve member 141.

The base valve member 141 has an annular shape. The bolt member 144 is inserted into the base valve member 141. A plurality of passage holes 149 that circulate oil between the lower chamber 20 and the reservoir chamber 7 and a plurality of passage holes 150 that circulate oil between the lower chamber 20 and the reservoir chamber 7 on the outside of the passage holes 149 in the radial direction are formed in the base valve member 141. The disc 142 close to the reservoir chamber 7 allows the oil flowing from the lower chamber 20 to flow toward the reservoir chamber 7 via the passage holes 149. On the other hand, the disc 142 restricts the flow of the oil from the reservoir chamber 7 toward the lower chamber 20 via the inside passage holes 149. The disc 143 allows the oil flowing from the reservoir chamber 7 to flow toward the lower chamber 20 via the passage holes 150.

On the other hand, the disc 143 restricts the flow of the oil from the lower chamber 20 toward the reservoir chamber 7 via the outside passage holes 150.

The disc 142 constitutes a compression-side damping valve 152 that is opened in the compression stroke by the base valve member 141, makes oil flow from the lower chamber 20 to the reservoir chamber 7, and generates a damping force. The disc 143 constitutes a suction valve 153 that is opened in the extension stroke of the shock absorber 1 by the base valve member 141 and makes oil flow from the reservoir chamber 7 into the lower chamber 20. The suction valve 153 mainly serves to make oil flow from the reservoir chamber 7 to the lower chamber 20 to make up for shortage of oil which is caused by the extension of the piston rod 21 from the cylinder 2 without substantially generating a damping force.

The locking member 146 has a tubular shape. An upper portion of the base valve member 141 is fitted inside the locking member 146. The base valve member 141 is fitted to an inner circumferential portion of the lower end of the inner cylinder 5 via the locking member 146. An end section of the locking member 146, which is close to the pistons 15 and 16, extends inward in the radial direction, and the support plate 147 is locked on this extending portion at an outer circumferential portion of the support plate 147. An inner circumferential portion of the support plate 147 locks the support flange section 161 of the metering pin 31 near the pistons 15 and 16. Thereby, the locking member 146 and the support plate 147 maintain contact between the support flange section 161 of the metering pin 31 and the bolt member 144.

The metering pin 31 has the support flange section 161 that is supported by the base valve 25, a first large diameter section 162 that has a smaller diameter than the support flange section 161 and extends from the support flange section 161 in the axial direction, a first tapered section 163 that extends from a side of the first large diameter section 162 which faces the support flange section 161 in the axial direction and is illustrated in FIG. 3, and a reduced diameter section 164 that extends from a side of the first tapered section 163, which is opposite to the first large diameter section 162, and has a smaller diameter than the first large diameter section 162. The metering pin 31 has a second tapered section 165 that extends in the axial direction from a side of the reduced diameter section 164, which is opposite to the first tapered section 163, and a second large diameter section 166 that extends in the axial direction from a side of the second tapered section 165, which is opposite to the reduced diameter section 164.

The first large diameter section 162 has a constant diameter. The reduced diameter section 164 has a constant diameter that is smaller than the first large diameter section 162. The first tapered section 163 is continuous with the first large diameter section 162 and the reduced diameter section 164 and has a tapered shape that is reduced in diameter as it approaches the reduced diameter section 164. The second large diameter section 166 has a constant diameter that is identical to the first large diameter section 162. The second tapered section 165 is continuous with the reduced diameter section 164 and the second large diameter section 166 and has a tapered shape that is reduced in diameter as it approaches the reduced diameter section 164.

The metering pin 31 is inserted into the insertion hole 30 of the piston rod 21. The intra-rod passage 32 is formed between the metering pin 31 and the insertion hole 30 of the piston rod 21. Due to the movement of the pistons 15 and 16, the intra-rod passage 32 communicates between the upper chamber 18 and the lower chamber 20 such that the oil flows. In addition to the passages 101, 102, 116 and 117, the intra-rod passage 32 and the communication passage 132 allow the upper chamber 18, the middle chamber 19, and the lower chamber 20 to communicate with one another.

The small diameter hole section 48 located at the middle portion of the piston rod 21 in the axial direction is provided between the upper chamber 18 and the communication passage 132 that always communicates with the middle chamber 19 in the intra-rod passage 32. Therefore, the small diameter hole section 48 and the metering pin 31 constitute a first adjustment section 171 that adjusts a flow passage area of a flow passage interposing the intra-rod passage 32 between the upper chamber 18 and the middle chamber 19 according to a position of the piston rod 21, that is, according to positions of the first piston 15 and the second piston 16. When the small diameter hole section 48 aligns an axial position thereof with the first and second large diameter sections 162 and 166 of the metering pin 31, the first adjustment section 171 minimizes a flow passage area between the upper chamber 18 and the middle chamber 19. When the small diameter hole section 48 aligns a position thereof with the reduced diameter section 164 of the metering pin 31, the first adjustment section 171 maximizes the flow passage area between the upper chamber 18 and the middle chamber 19. That is, the first adjustment section 171 constitutes a variable orifice. A flow passage area in the variable orifice is adjusted by the metering pin 31.

The small diameter hole section 137 of the nut 78 located at the end section of the piston rod 21 in the axial direction is provided between the lower chamber 20 and the communication passage 132 that always communicates with the middle chamber 19 in the intra-rod passage 32. Therefore, the small diameter hole section 137 and the metering pin 31 constitute a second adjustment section 172 that adjusts a flow passage area of a flow passage interposing the intra-rod passage 32 of the oil between the middle chamber 19 and the lower chamber 20 according to the position of the piston rod 21, that is, according to the positions of the first piston 15 and the second piston 16.

When the small diameter hole section 137 aligns an axial position thereof with the first and second large diameter sections 162 and 166 of the metering pin 31, the second adjustment section 172 minimizes a flow passage area between the middle chamber 19 and the lower chamber 20. When the small diameter hole section 137 aligns a position thereof with the reduced diameter section 164 of the metering pin 31, the second adjustment section 172 maximizes the flow passage area between the middle chamber 19 and the lower chamber 20. The second adjustment section 172 also constitutes a variable orifice. A flow passage area in the variable orifice is adjusted by the metering pin 31.

Figure 4:
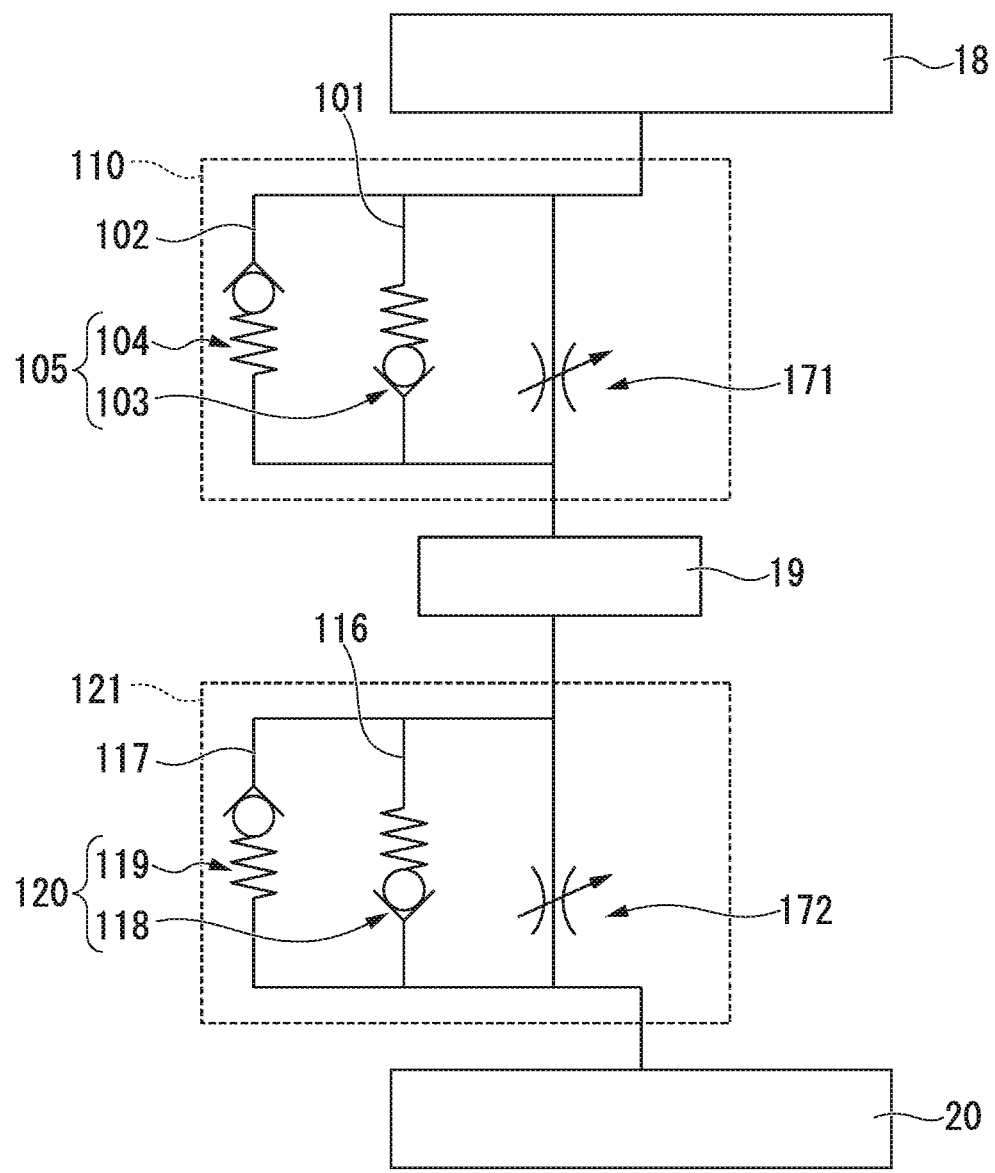
FIG. 4 is a hydraulic circuit diagram of main sections of the shock absorber of the first embodiment according to the present invention.

Thereby, in view of a hydraulic circuit, as illustrated in FIG. 4, the passages 101 on which the compression-side damping valve 103 is arranged, the passages 102 on which the extension-side damping valve 104 is arranged, and the first adjustment section 171 are arranged in parallel between the upper chamber 18 and the middle chamber 19. The passages 101 and 102, the first damping-force generating device 105 made up of the compression-side damping valve 103 and the extension-side damping valve 104, and the first adjustment section 171 constitute a first piston section 110. In addition, the passages 116 on which the compression-side damping valve 118 is arranged, the passages 117 on which the extension-side damping valve 119 is arranged, and the second adjustment section 172 are arranged in parallel between the middle chamber 19 and the lower chamber 20. The passages 116 and 117, the second damping-force generating device 120 made up of the compression-side damping valve 118 and the extension-side damping valve 119, and the second adjustment section 172 constitute a second piston section 121.

As illustrated in FIG. 3, the reduced diameter section 164 of the metering pin 31 extends to be longer than an axial length between the small diameter hole section 48 of the piston rod 21 constituting the first adjustment section 171 and the small diameter hole section 137 of the nut 78 constituting the second adjustment section 172. Thereby, the reduced diameter section 164 of the metering pin 31 can overlap the axial positions of both the small diameter hole section 48 and the small diameter hole section 137 with each other at the same time. In this state, a flow passage area of the first end section of the intra-rod passage 32 has a maximum value regulated by flow passage areas of the small diameter hole section 48 and the reduced diameter section 164 of the first adjustment section 171, and a flow passage area of the second end section of the intra-rod passage 32 has a maximum value regulated by flow passage areas of the small diameter hole section 137 and the reduced diameter section 164 of the second adjustment section 172 so that the intra-rod passage 32 maintains the communication between the upper chamber 18 and the lower chamber 20.

Figure 5:
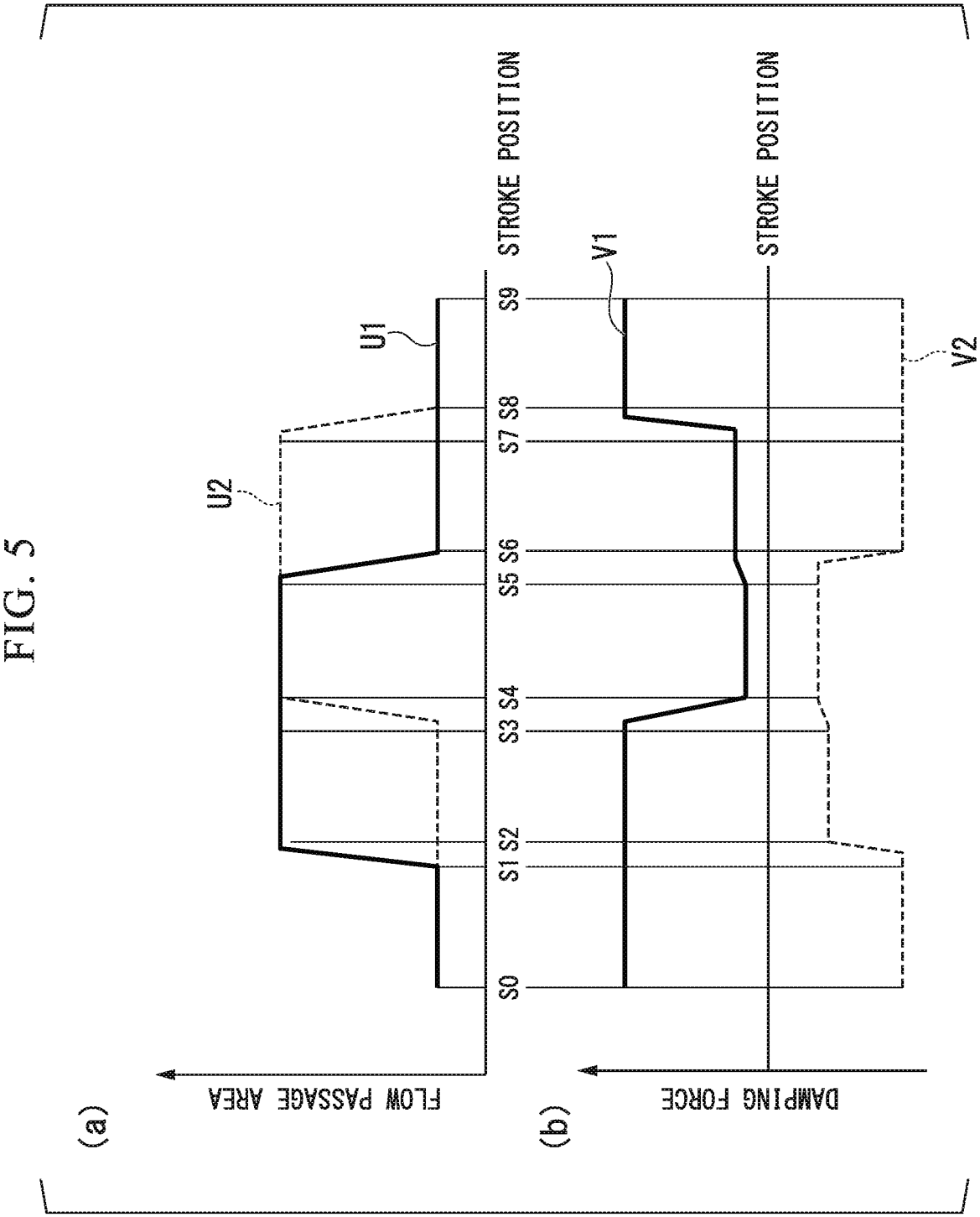

A solid line U1 of FIG. 5(*a*) represents a change in the flow passage area of the first adjustment section 171 of the first piston section 110 according to stroke positions of the first piston 15 and the second piston 16. A broken line U2 of FIG. 5(*a*) represents a change in the flow passage area of the second adjustment section 172 of the second piston section 121 according to the stroke positions of the first piston 15 and the second piston 16. A solid line V1 of FIG. 5(*b*) represents a relation between a stroke position and a damping force when the first piston 15 and the second piston 16 are moved in the extending direction. A broken line V2 of FIG. 5(*b*) represents a relation between a stroke position and a damping force when the first piston 15 and the second piston 16 are moved in the compressing direction.

In the shock absorber 1, when the stroke positions of the first piston 15 and the second piston 16 are within a first given range from S4 to S5 that includes a neutral position (a position of 1G (a position at which a vehicle body stopped at a horizontal position is supported)) and is shown in FIG. 5(*a*), both the small diameter hole section 48 and the small diameter hole section 137 of the piston rod 21 simultaneously overlap axial positions thereof with the reduced diameter section 164 of the metering pin 31. In other words, the first given range from S4 to S5 is a range in which a flow passage area is regulated by the reduced diameter section 164 of the metering pin 31. In the first given range from S4 to S5, the flow passage area of the first adjustment section 171 represented in FIG. 5(*a*) by the solid line U1 and the flow passage area of the second adjustment section 172 represented in FIG. 5(*a*) by the broken line U2 have the same maximum values. Therefore, the communication between the upper chamber 18 and the lower chamber 20 is maintained with a maximum flow passage area of the intra-rod passage 32.

When the first piston 15 and the second piston 16 are within the first given range from S4 to S5, the oil of the upper chamber 18 flows to the lower chamber 20 via the intra-rod passage 32 having the maximum flow passage area in the extension stroke in which the pistons are moved toward the upper chamber 18 side. Therefore, as represented by the solid line V1 of FIG. 5(*b*), a damping force enters into a soft state.

When the first piston 15 and the second piston 16 are within the first given range from S4 to S5, the oil of the lower chamber 20 flows to the upper chamber 18 via the intra-rod passage 32 having the maximum flow passage area in the compression stroke in which the pistons are moved toward the lower chamber 20 side. Therefore, as represented by the broken line V2 of FIG. 5(*b*), a damping force enters into the soft state.

In the shock absorber 1, when the stroke positions of the first piston 15 and the second piston 16 exceed the first given range from S4 to S5 and are within a second given range from S6 to S7 that is shown in FIG. 5(*a*) at a maximum length side at which the shock absorber 1 is set to a maximum length, the first adjustment section 171 aligns the axial positions of the small diameter hole section 48 and the second large diameter section 166 of the metering pin 31, and the second adjustment section 172 aligns the axial positions of the small diameter hole section 137 and the reduced diameter section 164 of the metering pin 31. In the second given range from S6 to S7, the flow passage area of the first adjustment section 171 made up of the small diameter hole section 48 and the second large diameter section 166 has the maximum value as represented by the solid line U1 of FIG. 5(*a*) and nearly closes the upper chamber 18 side, and the flow passage area of the second adjustment section 172 made up of the small diameter hole section 137 and the reduced diameter section 164 has the maximum value as represented by the broken line U2 of FIG. 5(*a*) so that the intra-rod passage 32 and the communication passage 132 maintain the communication between the lower chamber 20 and the middle chamber 19 with the flow passage area regulated by this maximum value.

When the first piston 15 and the second piston 16 are within the second given range from S6 to S7, the first adjustment section 171 narrows the intra-rod passage 32 in the extension stroke in which the first piston 15 and the second piston 16 are moved toward the upper chamber 18 side. For this reason, entry of the oil of the upper chamber 18 into the intra-rod passage 32 is restricted, and the oil passes through the passages 102 of the first piston 15 and flows into the middle chamber 19 by opening the extension-side damping valve 104 having a soft damping force property. The second adjustment section 172 opens the intra-rod passage 32 with the maximum flow passage area. For this reason, the oil of the middle chamber 19 flows from the middle chamber 19 to the lower chamber 20 via the communication passage 132 and the intra-rod passage 32 having the maximum flow passage area. Therefore, as represented by the solid line V1 of FIG. 5(*b*), the damping force is maintained in the soft state while entering into a slightly harder state than the first given range from S4 to S5.

When the first piston 15 and the second piston 16 are within the second given range from S6 to S7, the second adjustment section 172 opens the intra-rod passage 32 with the maximum flow passage area in the compression stroke in which the first piston 15 and the second piston 16 are moved toward the lower chamber 20 side, and the first adjustment section 171 nearly closes the intra-rod passage 32. For this reason, the oil of the lower chamber 20 flows toward the middle chamber 19 via the intra-rod passage 32 and the communication passage 132, passes through the passages 101 of the first piston 15, and flows to the upper chamber 18 by opening the compression-side damping valve 103 having a hard damping force property. Therefore, as represented by the broken line V2 of FIG. 5(*b*), the damping force enters into a softer state than the first given range from S4 to S5 and a third given range from S2 to S3 (to be described below).

In the shock absorber 1, when the stroke positions of the first piston 15 and the second piston 16 exceed the first given range from S4 to S5 and are within the third given range from S2 to S3 that is shown in FIG. 5(*a*) at a minimum length side at which the shock absorber 1 is set to a minimum length, the first adjustment section 171 aligns the axial positions of the small diameter hole section 48 and the reduced diameter section 164 of the metering pin 31, and the second adjustment section 172 aligns the axial positions of the small diameter hole section 137 and the first large diameter section 162 of the metering pin 31. In the third given range from S2 to S3, the flow passage area of the second adjustment section 172 made up of the small diameter hole section 137 and the first large diameter section 162 has the maximum value as represented by the broken line U2 of FIG. 5(*a*) and nearly closes the intra-rod passage 32 close to the lower chamber 20, and the flow passage area of the first adjustment section 171 made up of the small diameter hole section 48 and the reduced diameter section 164 has the maximum value as represented by the solid line U1 of FIG. 5(*a*) so that the intra-rod passage 32 and the communication passage 132 maintain the communication between the upper chamber 18 and the middle chamber 19 with the flow passage area regulated by this maximum value.

When the first piston 15 and the second piston 16 are within the third given range from S2 to S3, the first adjustment section 171 opens the intra-rod passage 32 with the maximum flow passage area in the extension stroke in which the pistons are moved toward the upper chamber 18 side, and the second adjustment section 172 nearly closes the intra-rod passage 32. For this reason, the oil of the upper chamber 18 flows to the passages 117 via the intra-rod passage 32 and the communication passage 132, is introduced to the middle chamber 19, and flows to the lower chamber 20 by opening the extension-side damping valve 119 having a soft damping force property. Therefore, as represented by the solid line V1 of FIG. 5(*b*), the damping force enters into a harder state than the second given range from S6 to S7.

When the first piston 15 and the second piston 16 are within the third given range from S2 to S3, the second adjustment section 172 narrows the intra-rod passage 32 in the compression stroke in which the pistons are moved toward the lower chamber 20 side. For this reason, entry of the oil of the lower chamber 20 into the intra-rod passage 32 is restricted and the oil passes through the passages 116 of the second piston 16 and flows to the middle chamber 19 by opening the compression-side damping valve 118 having a soft damping force property. Since the first adjustment section 171 opens the intra-rod passage 32 with the maximum flow passage area, the oil of the middle chamber 19 flows from the passages 117 to the upper chamber 18 via the communication passage 132 and the intra-rod passage 32 having the maximum flow passage area. Therefore, as represented by the broken line V2 of FIG. 5(*b*), the damping force is maintained in the soft state while entering into a slightly harder state than the first given range from S4 to S5.

In the shock absorber 1, when the stroke positions of the first piston 15 and the second piston 16 exceed the second given range from S6 to S7 and are within a fourth given range from S8 to S9 up to a full extension position S9 at a maximum length side, the first adjustment section 171 and the second adjustment section 172 align the axial positions of the small diameter hole sections 48 and 137 with that of the second large diameter section 166 of the metering pin 31. In the fourth given range from S8 to S9, the flow passage area of the first adjustment section 171 made up of the small diameter hole section 48 and the second large diameter section 166 has the minimum value as represented by the solid line U1 of FIG. 5(a) and nearly closes the intra-rod passage 32 close to the upper chamber 18, and the flow passage area of the second adjustment section 172 made up of the small diameter hole section 137 and the second large diameter section 166 has the minimum value as represented by the broken line U2 of FIG. 5(a) and nearly closes the intra-rod passage 32 close to the lower chamber 20 so that the restriction of the communication between the upper chamber 18, the middle chamber 19, and the lower chamber 20 by the intra-rod passage 32 is maintained.

When the first piston 15 and the second piston 16 are within the fourth given range from S8 to S9, the first adjustment section 171 and the second adjustment section 172 nearly close the intra-rod passage 32 in the extension stroke in which the first piston 15 and the second piston 16 are moved toward the upper chamber 18 side. For this reason, the oil of the upper chamber 18 passes through the passages 102, flows to the middle chamber 19 by opening the extension-side damping valve 104 having a soft damping force property, passes through the passages 117, and flows to the lower chamber 20 by opening the extension-side damping valve 119 having a hard damping force property. Therefore, as represented by the solid line V1 of FIG. 5(b), the damping force enters into the soft state like the third given range from S2 to S3. Thereby, in the event of full extension, the damping force enters into a hard state and suppression of abnormal noises and improvement of riding comfort can be ensured.

When the first piston 15 and the second piston 16 are within the fourth given range from S8 to S9, the first adjustment section 171 and the second adjustment section 172 nearly close the intra-rod passage 32 in the compression stroke in which the first piston 15 and the second piston 16 are moved toward the lower chamber 20 side. For this reason, the oil of the lower chamber 20 passes through the passages 116, flows to the middle chamber 19 by opening the compression-side damping valve 118 having a soft damping force property, passes through the passages 101, and flows to the upper chamber 18 by opening the compression-side damping valve 103 having a hard damping force property. Therefore, as represented by the broken line V2 of FIG. 5(b), the damping force enters into the hard state like the second given range from S6 to S7.

In the shock absorber 1, when the stroke positions of the first piston 15 and the second piston 16 exceed the third given range from S2 to S3 and are within a fifth given range from S0 to S1 up to a full compression position S0 at a minimum length side, the first adjustment section 171 and the second adjustment section 172 align the axial positions of both of the small diameter hole sections 48 and 137 with that of the first large diameter section 162 of the metering pin 31. In the fifth given range, the flow passage area of the first adjustment section 171 made up of the small diameter hole section 48 and the first large diameter section 162 has the minimum value as represented by the solid line U1 of FIG. 5(a) and nearly closes the intra-rod passage 32 close to the upper chamber 18, and the flow passage area of the second adjustment section 172 made up of the small diameter hole section 137 and the first large diameter section 162 has the minimum value as represented by the broken line U2 of FIG. 5(a) and nearly closes the intra-rod passage 32 close to the lower chamber 20 so that the restriction of the communication between the upper chamber 18, the middle chamber 19, and the lower chamber 20 by the intra-rod passage 32 is maintained.

When the first piston 15 and the second piston 16 are within the fifth given range from S0 to S1, the first adjustment section 171 and the second adjustment section 172 nearly close the intra-rod passage 32 in the extension stroke in which the first piston 15 and the second piston 16 are moved toward the upper chamber 18 side. For this reason, the oil of the upper chamber 18 passes the passages 102, flows to the middle chamber 19 by opening the extension-side damping valve 104 having a soft damping force property, passes the passages 117, and flows to the upper chamber 18 by opening the extension-side damping valve 119 having a hard damping force property. Therefore, as represented by the solid line V1 of FIG. 5(b), the damping force enters into the hard state like the third given range from S2 to S3.

When the first piston 15 and the second piston 16 are within the fifth given range from S0 to S1, the first adjustment section 171 and the second adjustment section 172 nearly close the intra-rod passage 32 in the compression stroke in which the first piston 15 and the second piston 16 are moved toward the lower chamber 20 side. For this reason, the oil of the lower chamber 20 passes the passages 116, flows to the middle chamber 19 by opening the compression-side damping valve 118 having a soft damping force property, passes the passages 101, and flows to the upper chamber 18 by opening the compression-side damping valve 103 having a hard damping force property. Therefore, as represented by the broken line V2 of FIG. 5(b), the damping force enters into the hard state like the second given range from S6 to S7. Thereby, in the event of full compression, the damping force enters into the hard state and the suppression of abnormal noises and the improvement of riding comfort can be ensured.

That is, the first adjustment section 171 and the second adjustment section 172 constitute a position-based state changing device 175 that changes a state of the intra-rod passage 32 depending on a position of the piston rod 21 having the small diameter hole sections 48 and 137 and positions of the first and second pistons 15 and 16 connected to the piston rod 21. The position-based state changing device 175 changes the state of the intra-rod passage 32 to a state in which the upper chamber 18, the middle chamber 19, and the lower chamber 20 communicate with one another with the maximum flow passage area, a state in which the upper chamber 18 and the middle chamber 19 communicate with each other with the maximum flow passage area and the communication between the upper chamber 18, the middle chamber 19, and the lower chamber 20 is restricted, a state in which the lower chamber 20 and the middle chamber 19 communicate with each other with the maximum flow passage area and the communication between the lower chamber 20 and the middle chamber 19 and between the lower chamber 20 and the upper chamber 18 is restricted, and a state in which the communication between the upper chamber 18, the middle chamber 19, and the lower chamber 20 is restricted depending on the positions of the first and second pistons 15 and 16.

Thereby, in the shock absorber 1, as illustrated in FIG. 5, when the first piston 15 and the second piston 16 are within the first given range from S4 to S5 including the neutral position, damping forces of both a movement in the extending direction and a movement in the compressing direction enter into the soft state. In the shock absorber 1, when the first piston 15 and the second piston 16 are within the second given range from S6 to S7 at the maximum length side, a damping force of a movement in the extending direction enters into the soft state, and a damping force of a movement in the compressing direction enters into the hard state. In the shock absorber 1, when the first piston 15 and the second piston 16 are within the third given range from S2 to S3 at the minimum length side, a damping force of a movement in the extending direction enters into the hard state, and a damping force of a movement in the compressing direction enters into the soft state. Further, in the shock absorber 1, when the first piston 15 and the second piston 16 are within the fourth given range from S8 to S9 at the maximum length side and within the fifth given range from S0 to S1 at the minimum length side, damping forces of a movement in the extending direction and a movement in the compressing direction enter into the hard state together. That is, the shock absorber 1 has inversion-type position-sensitive damping force change characteristics in which a relation between the hard state and the soft state of the movement in the extending direction and the movement in the compressing direction is inverted within the second given range from S6 to S7 at the maximum length side and the third given range from S2 to S3 at the minimum length side.

Figure 6:
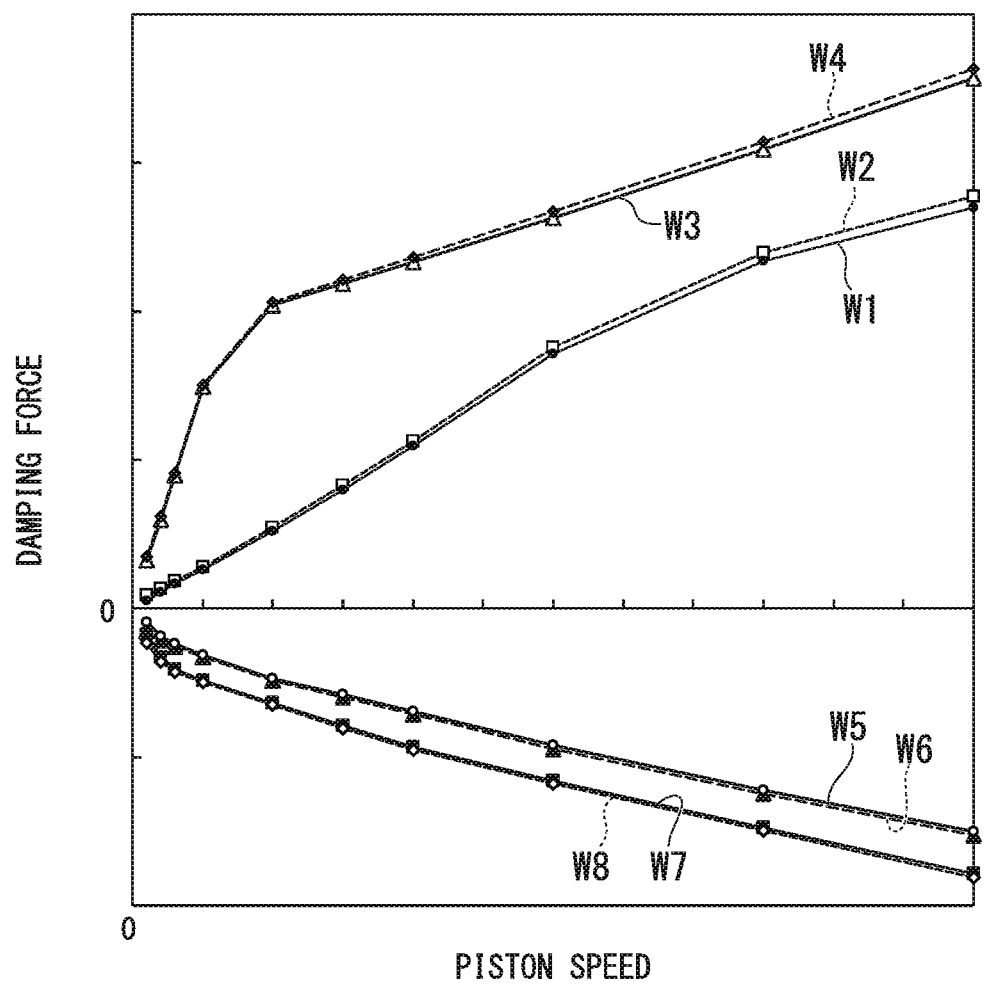
FIG. 6 is a characteristic diagram illustrating results of simulation of the damping force to a piston speed of the shock absorber of the first embodiment according to the present invention.

FIG. 6 shows results of simulation of a damping force property to a piston speed of the shock absorber 1.

As can be seen in FIG. 6, a damping force property (a solid line W1 of FIG. 6) during movement in the extending direction when the first piston 15 and the second piston 16 are within the first given range from S4 to S5 and a damping force property (a broken line W2 of FIG. 6) during movement in the compressing direction when the first piston 15 and the second piston 16 are within the second given range from S6 to S7 enter into the soft state in the full range of a piston speed in substantially the same way. In contrast, a damping force property (a solid line W3 of FIG. 6) during movement in the extending direction when the first piston 15 and the second piston 16 are within the third given range from S2 to S3 and a damping force property (a broken line W4 of FIG. 6) during movement in the extending direction when the first piston 15 and the second piston 16 are within the fourth given range from S8 to S9 and the fifth given range from S0 to S1 enter into the hard state in the full range of the piston speed in substantially the same way. In any damping force property, as the piston speed increases, the damping force enters into the hard state.

A damping force property (a solid line W5 of FIG. 6) during movement in the compressing direction when the first piston 15 and the second piston 16 are within the first given range from S4 to S5 and a damping force property (a broken line W6 of FIG. 6) during movement in the compressing direction when the first piston 15 and the second piston 16 are within the third given range from S2 to S3 enters into the soft state in the full range of the piston speed in substantially the same way. In contrast, a damping force property (a solid line W7 of FIG. 6) during movement in the compressing direction when the first piston 15 and the second piston 16 are within the second given range from S6 to S7 and a damping force property (a broken line W8 of FIG. 6) during movement in the compressing direction when the first piston 15 and the second piston 16 are within the fourth given range from S8 to S9 and the fifth given range from S0 to S1 enter into the hard state in the full range of the piston speed in substantially the same way.

Figure 7:
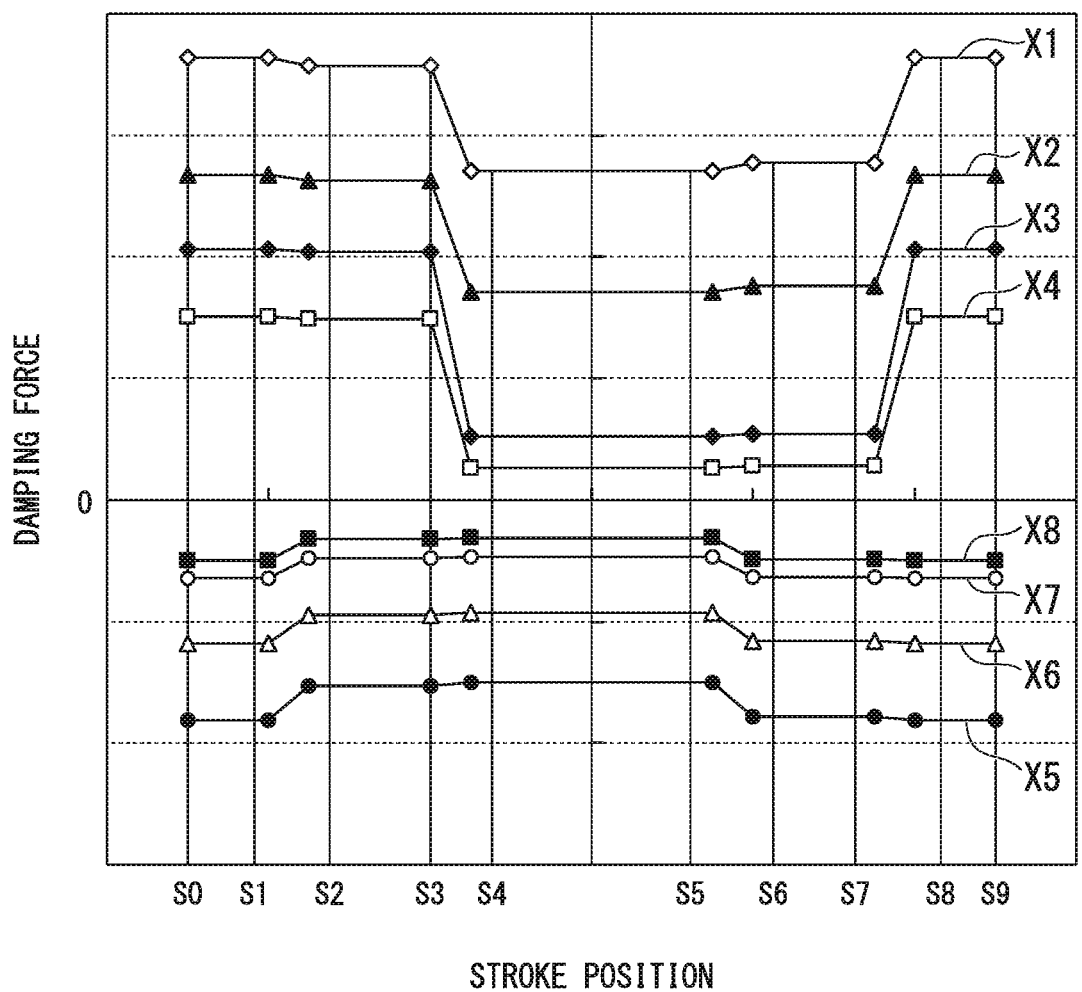
FIG. 7 is a characteristic diagram illustrating results of simulation of the damping force to stroke positions of pistons according to each piston speed of the shock absorber of the first embodiment according to the present invention.

FIG. 7 shows result of simulation of a damping force property according to the stroke positions of the first piston 15 and the second piston 16 of each piston speed of the shock absorber 1. In any one among during the movement in the extending direction when a piston speed represented in FIG. 7 by X1 is a high speed (particularly, 0.6 m/s), during the movement in the extending direction when a piston speed represented in FIG. 7 by X2 is an intermediate speed (particularly, 0.3 m/s), during the movement in the extending direction when a piston speed represented in FIG. 7 by X3 is a low speed (particularly, 0.1 m/s), and during the movement in the extending direction when a piston speed represented in FIG. 7 by X4 is an extremely low speed (particularly, 0.05 m/s), the damping forces of the third given range from S2 to S3, the fourth given range from S8 to S9, and the fifth given range from S0 to S1 enter into a harder state than the damping forces of the first given range from S4 to S5 and the second given range from S6 to S7. However, as the piston speed becomes high while maintaining this relation, the damping force enters into the hard state.

In any of during the movement in the compressing direction when a piston speed represented in FIG. 7 by X5 is a high speed (particularly, 0.6 m/s), during the movement in the compressing direction when a piston speed represented in FIG. 7 by X6 is an intermediate speed (particularly, 0.3 m/s), during the movement in the compressing direction when a piston speed represented in FIG. 7 by X7 is a low speed (particularly, 0.1 m/s), and during the movement in the compressing direction when a piston speed represented in FIG. 7 by X8 is an extremely low speed (particularly, 0.05 m/s), the damping forces of the second given range from S6 to S7, the fourth given range from S8 to S9, and the fifth given range from S0 to S1 enters into a harder state than the damping forces of the first given range from S4 to S5 and the third given range from S2 to S3. However, as the piston speed becomes high while maintaining this relation, the damping force enters into the hard state.

Figure 8:
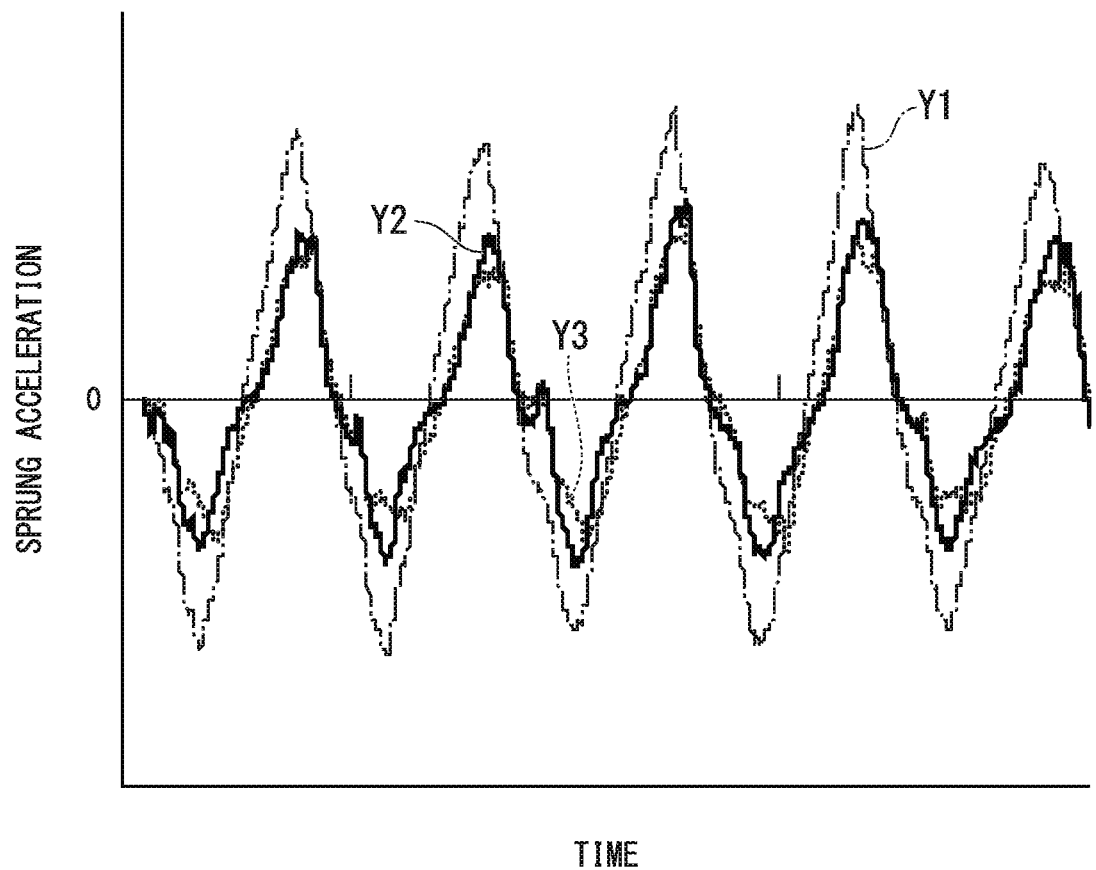
FIG. 8 is a characteristic diagram illustrating results of simulation of a sprung acceleration during traveling on a long waveform road of a vehicle on which the shock absorber of the first embodiment according to the present invention is mounted.

The damping force change characteristics described above are obtained, and thereby a force used to vibrate a spring can be reduced (i.e., soft), and a force used to damp a spring can be increased (i.e., hard). A high-quality riding comfort such as skyhook control is obtained without electronic control. FIG. 8 shows a sprung acceleration for illustrating an effect of riding comfort during traveling on a bad road of the vehicle on which the shock absorber 1 is mounted. FIG. 8 shows results of simulation of the sprung acceleration during traveling on a long waveform road at a speed of 60 km per hour. According to the shock absorber 1 of the present embodiment which has a position sensitive function represented in FIG. 8 by a solid line Y2 with respect to a case in which there is no position sensitive function represented in FIG. 8 by a dashed-dotted line Y1, it is understood that the sprung acceleration during traveling on the bad rod is sharply reduced. This shows that sprung movement is reduced and that the riding comfort during traveling on the bad rod is improved. The same performance as an expensive and electronically controlled semi-active suspension represented in FIG. 8 by a broken line Y3 is obtained.

Figure 9:
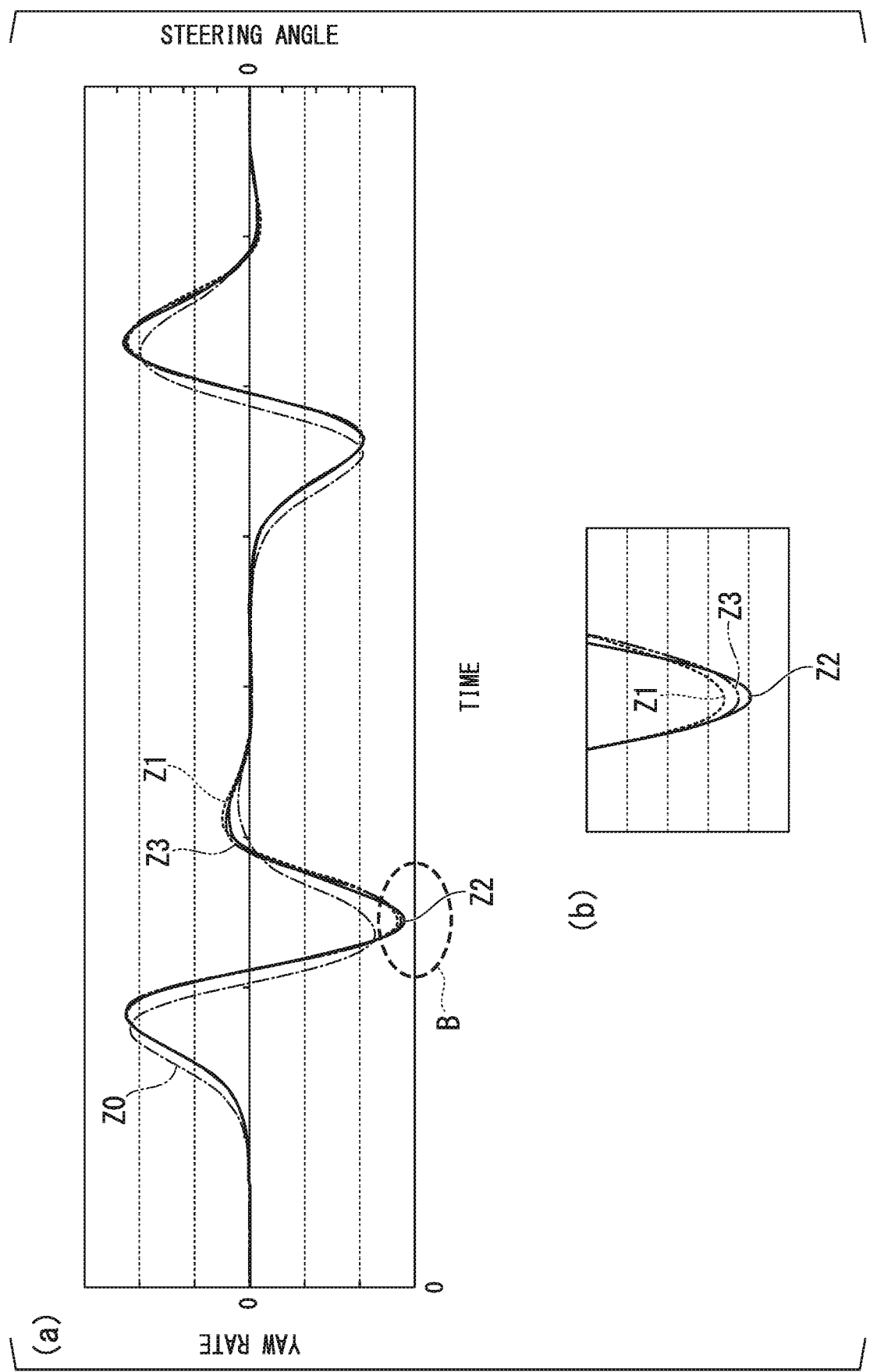

FIG. 9 shows results of simulation of a yaw rate at the time of double lane change during traveling of the vehicle on which the shock absorber 1 is mounted at a speed of 80 km per hour. A dashed-dotted line Z0 of FIG. 9 is a steering angle. The shock absorber 1 of the present embodiment which has a position sensitive function represented in FIG. 9 by a solid line Z2 with respect to a case in which there is no position sensitive function represented in FIG. 9 by a broken line Z1 has a great turn-over yaw rate and high steering responsivenesss. The turn-over yaw rate up to the same level as the expensive and electronically controlled semi-active suspension represented in FIG. 9 by a dashed-two dotted line Z3 can be increased, and the steering responsivenesss is high.

The shock absorber described in Patent Literature 1 above is configured to provide two pistons, each of which has a damping valve, and switch a state in which the damping valve of the piston located upstream is bypassed and a damping force is generated by the damping valve of the piston located downstream and a state in which a hard damping force is generated by the damping valves of the two pistons without bypassing the damping valve of the piston located upstream depending on positions of the pistons. On the other hand, it is expected that a degree of freedom in setting the damping force is enhanced.

In the shock absorber 1 according to the first embodiment, the position-based state changing device 175 changes the state of the passage to the state in which the upper chamber 18 and the lower chamber 20 communicate with each other, the state in which the upper chamber 18 and the middle chamber 19 communicate with each other, and the state in which the lower chamber 20 and the middle chamber 19 communicate with each other. For this reason, the shock absorber 1 can communicate between the upper chamber 18 and the lower chamber 20 to make the damping force in the soft state, communicate between the upper chamber 18 and the middle chamber 19 to generate the damping force using the second damping-force generating device 120 provided between the middle chamber 19 and the lower chamber 20, or communicate between the lower chamber 20 and the middle chamber 19 to generate the damping force using the first damping-force generating device 105 provided between the middle chamber 19 and the upper chamber 18.

Therefore, the degree of freedom in setting the damping force is enhanced.

To be more specific, aside from the passages 101, 102, 116 and 117 that are provided on the first piston 15 and the second piston 16 and communicate between the upper chamber 18 and the middle chamber 19 and between the middle chamber 19 and the lower chamber 20 such that the oil flows, the intra-rod passage 32 is provided, and the first adjustment section 171 that adjusts the flow passage area of the oil between the upper chamber 18 and the middle chamber 19 depending on the positions of the first piston 15 and the second piston 16 and the second adjustment section 172 that adjusts the flow passage area of the oil between the lower chamber 20 and the middle chamber 19 depending on the positions of the first piston 15 and the second piston 16 are provided in the intra-rod passage 32. When the first piston 15 and the second piston 16 are within the first given range from S4 to S5 including the neutral position, the flow passage areas of the first adjustment section 171 and the second adjustment section 172 are increased together, and communicate between the upper chamber 18 and the lower chamber 20 to make the damping force in the soft state.

When the first piston 15 and the second piston 16 exceed the first given range from S4 to S5 and are within the second given range from S6 to S7 at the maximum length side, the flow passage area of the first adjustment section 171 is reduced, and the flow passage area of the second adjustment section 172 is increased. Therefore, in the extension stroke, the oil of the upper chamber 18 can flow to the lower chamber 20 via the middle chamber 19 and the second adjustment section 172 while passing through the extension-side damping valve 104 of the first piston 15. In addition, in the compression stroke, the oil of the lower chamber 20 can flow to the upper chamber 18 while flowing from the second adjustment section 172 to the middle chamber 19 to pass through the compression-side damping valve 103 of the first piston 15.

When the first piston 15 and the second piston 16 exceed the first given range from S4 to S5 and are within the third given range from S2 to S3 at the minimum length side, the flow passage area of the first adjustment section 171 is increased, and the flow passage area of the second adjustment section 172 is reduced. Therefore, in the extension stroke, the oil of the upper chamber 18 can flow to the lower chamber 20 while being introduced to the middle chamber 19 via the first adjustment section 171 and passing through the extension-side damping valve 119 of the second piston 16. In addition, in the compression stroke, the oil of the lower chamber 20 can pass through the compression-side damping valve 118 of the second piston 16 to flow to the middle chamber 19, and flow to the upper chamber 18 via the first adjustment section 171. Therefore, the degree of freedom in setting the damping force is enhanced.

The extension-side damping valve 104 of the first piston 15 of the extension-side damping valve 119 of the second piston 16 are set such that, when the first piston 15 and the second piston 16 move in the extending direction, the damping force generated by the extension-side damping valve 104 located upstream is smaller than the damping force generated by the extension-side damping valve 119 located downstream. For this reason, the damping force can be made soft due to the flow of the oil passing through the extension-side damping valve 104 in the extension stroke when the pistons are within the second given range from S6 to S7, and the damping force can be made hard due to the flow of the oil passing through the extension-side damping valve 119 in the extension stroke when the pistons are within the third given range from S2 to S3.

The compression-side damping valve 103 of the first piston 15 and the compression-side damping valve 118 of the second piston 16 are set such that, when the first piston 15 and the second piston 16 move in the compressing direction, the damping force generated by the compression-side damping valve 118 located upstream is smaller than the damping force generated by the compression-side damping valve 103 located downstream. For this reason, the damping force can be made soft due to the flow of the oil passing through the compression-side damping valve 118 in the compression stroke when the pistons are within the third given range from S2 to S3, and the damping force can be made hard due to the flow of the oil passing through the compression-side damping valve 103 in the compression stroke when the pistons are within the second given range from S6 to S7.

When the first piston 15 and the second piston 16 exceed the second given range from S6 to S7 and are within the fourth given range from S8 to S9 located at the maximum length side and when the first piston 15 and the second piston 16 exceed the third given range from S2 to S3 and are within the fifth given range from S0 to S1 located at the minimum length side, the flow passage area of the first adjustment section 171 and the flow passage area of the second adjustment section 172 are reduced together. Therefore, since the intra-rod passage 32 is kept restricting any communication between the upper chamber 18, the middle chamber 19, and the lower chamber 20, the damping forces of the extension stroke and the compression stroke are increased together. Thereby, the damping forces during the full extension and full compression can be increased, and the suppression of abnormal noises and the improvement of riding comfort can be ensured.

Since the metering pin 31 having the reduced diameter section 164 that extends to be longer than the axial length between the first adjustment section 171 and the second adjustment section 172 and regulates the first given range from S4 to S5 is used, the shock absorber 1 can be made in a simple structure.

In the first embodiment, relations between lengths of the first large diameter section 162, the reduced diameter section 164, and the second large diameter section 166 of the metering pin 31 and a length between the small diameter hole section 48 of the first adjustment section 171 and the small diameter hole section 137 of the second adjustment section 172 may be changed such that up to the full extension position S9, the first adjustment section 171 may align the axial positions of the small diameter hole section 48 and the second large diameter section 166 of the metering pin 31, and the second adjustment section 172 may align the axial positions of the small diameter hole section 137 and the reduced diameter section 164 of the metering pin 31. That is, the second given range from S6 to S7 meeting these relations may extend up to the full extension position S9. Likewise, up to the full compression position S0, the first adjustment section 171 may align the axial positions of the small diameter hole section 48 and the reduced diameter section 164 of the metering pin 31, and the second adjustment section 172 may align the axial positions of the small diameter hole section 137 and the first large diameter section 162 of the metering pin 31. The third given range from S2 to S3 meeting these relations may extend up to the full compression position S0.

Among these changes, the change of only any one of the extension side and compression side may be adopted. Preferably, in at least any one of the case in which the first piston 15 and the second piston 16 exceed the second given range from S6 to S7 and are located at the maximum length side and the case in which the first piston 15 and the second piston 16 exceed the third given range from S2 to S3 and are located at the minimum length side, the flow passage areas of the first adjustment section 171 and the second adjustment section 172 may be set to be reduced together. More preferably, in both the cases, the flow passage areas of the first adjustment section 171 and the second adjustment section 172 may be set to be reduced together.

A portion having a much larger diameter than the first large diameter section 162 and the second large diameter section 166 may be provided at a side of at least one of the first and second large diameter sections 162 and 166 of the metering pin 31 which is opposite to the reduced diameter section 164, and the damping force may be further enhanced in at least one of the vicinity of the first large diameter section 162 and the vicinity of the second large diameter section 166. In this case, since the damping force can be further enhanced at the full extension position and the full compression position, the stopper 35 that can protect the piston or the base valve during the full extension or during the full compression and improve the riding comfort can be removed.

Therefore, an improvement in productivity by reducing the number of components and miniaturization by reducing the axial length can be ensured.

The first embodiment is not limited to the double cylinder shock absorber, and may be applied to a single cylinder shock absorber. In this case, a free-piston is provided in the cylinder at a side of the second piston which is opposite to the extension side of the piston rod, and an intermediate member fixed to the cylinder is provided between the free-piston and the second piston and supports the metering pin.

Second Embodiment

Next, a second embodiment will be mainly described with reference to FIGS. 10 to 12 based on portions different from those of the first embodiment. Sections that are in common with those of the first embodiment are expressed with the same names and reference signs.

Figure 10:
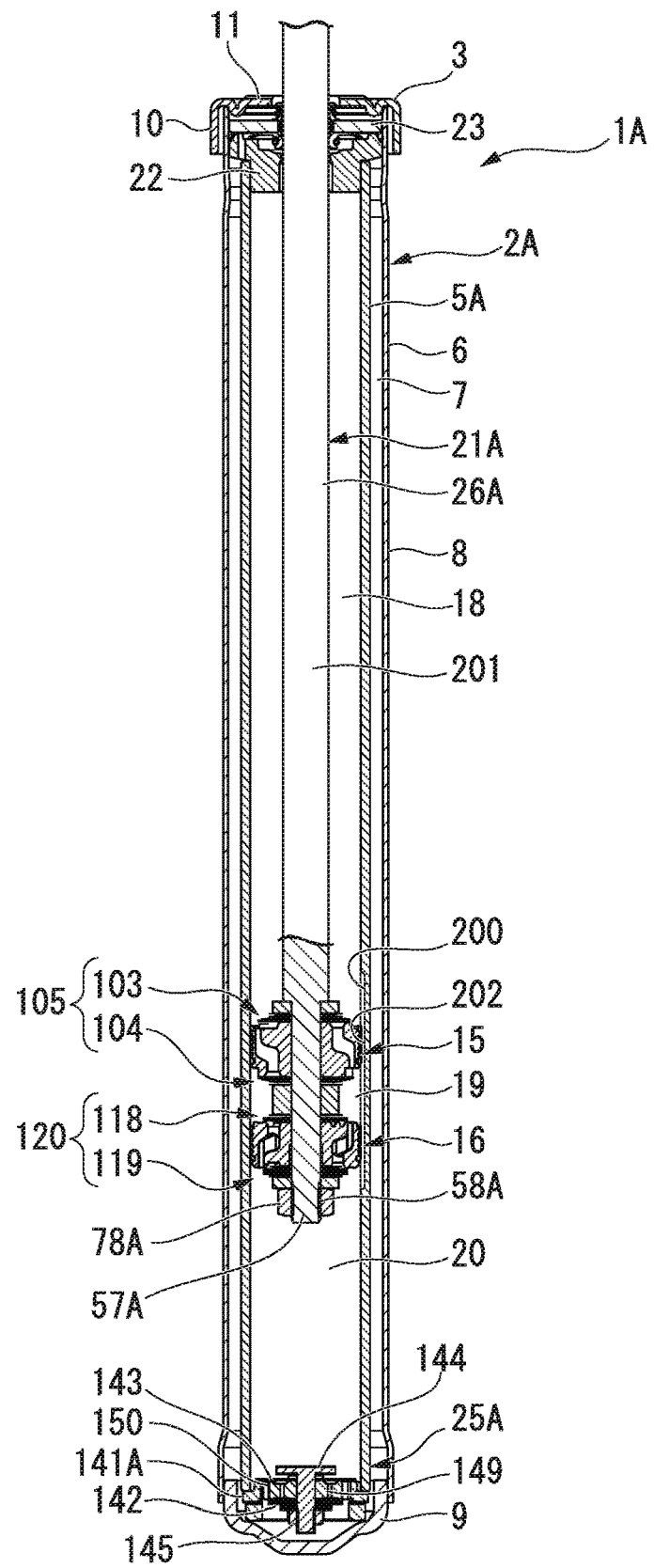
FIG. 10 is a sectional view illustrating a shock absorber of a second embodiment according to the present invention.

In a shock absorber 1A of the second embodiment shown in FIG. 10, a cylinder 2A that is partly different from the cylinder 2 is used, and particularly an inner cylinder 5A that is partly different from the inner cylinder 5 is used.

Figure 11:
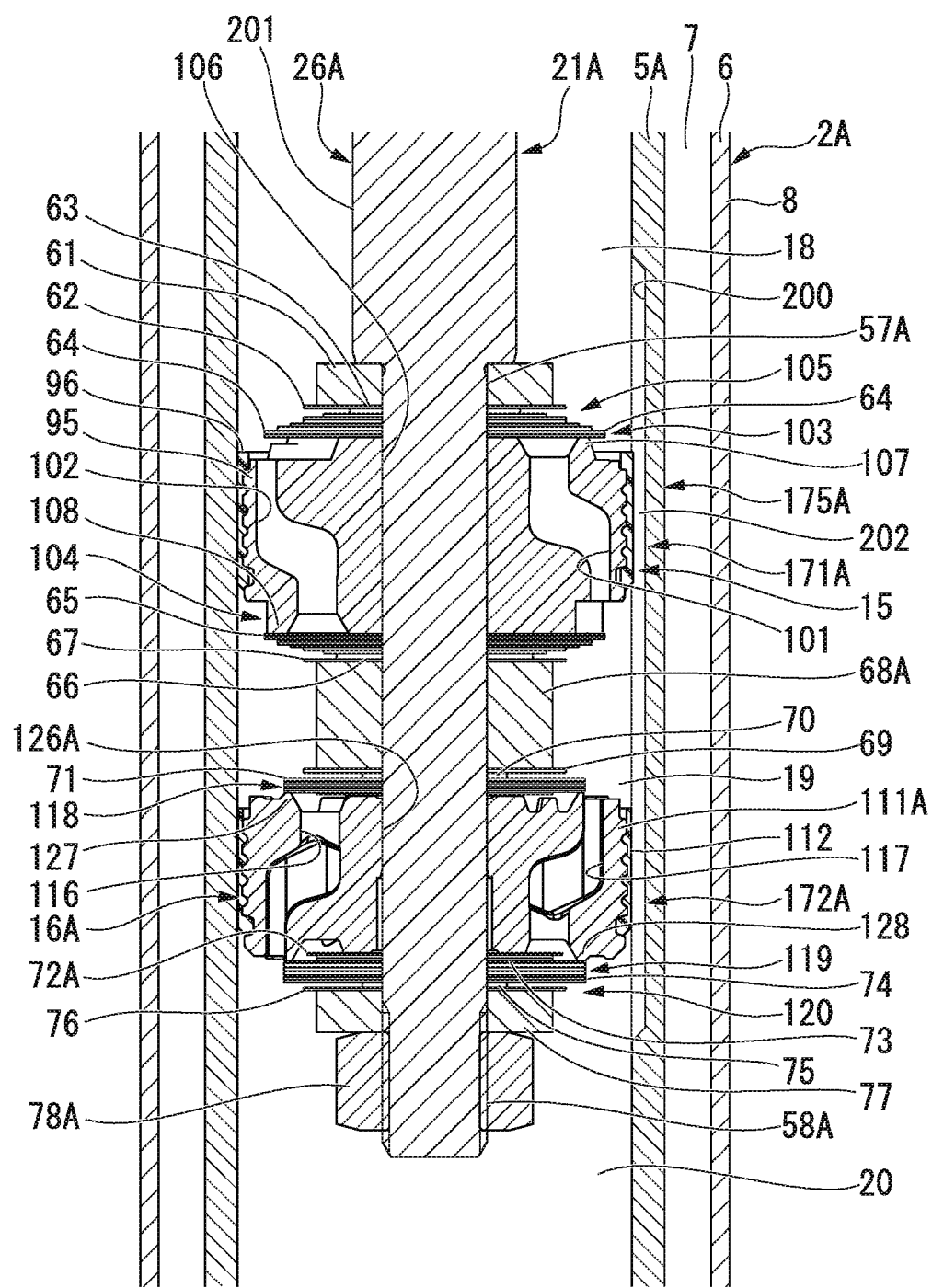
FIG. 11 is a partially enlarged sectional view illustrating main sections of the shock absorber of the second embodiment according to the present invention.
Figure 12:
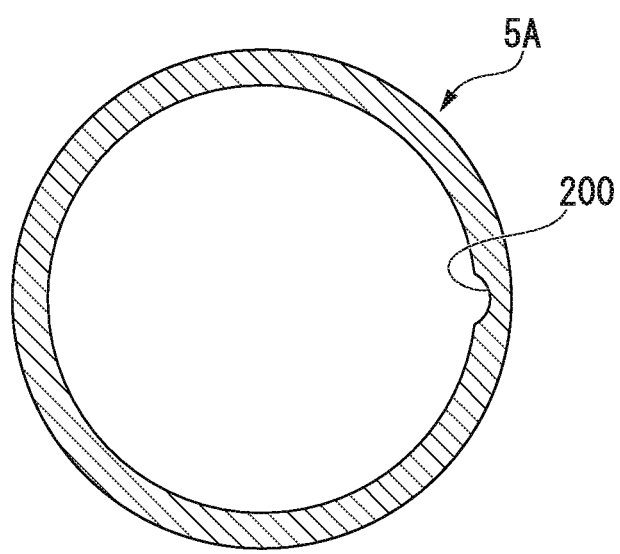
FIG. 12 is a sectional view illustrating an inner cylinder of the shock absorber of the second embodiment according to the present invention.

An axial groove 200 extending in an axial direction as illustrated in FIG. 11 is partly formed in an inner circumferential portion of the inner cylinder 5A as illustrated in FIG. 12. As illustrated in FIG. 10, in the shock absorber 1A, the metering pin 31 of the first embodiment is not provided, and a base valve 25A partly different from the base valve 25 is used. A locking member 146 and a support plate 147 for mounting the metering pin 31 are not provided in the base valve 25A. A base valve member 141A, an outer diameter of an upper portion of which is different from that of the base valve member 141 is used for the base valve 25A. The upper portion of the base valve member 141A is directly fitted with the inner cylinder 5A.

In the second embodiment, a piston rod 21A partly different from the piston rod 21 is used. The piston rod 21A has a rod main body 26A that is partly different from the rod main body 26 and the tip rod 27, and a nut 78A that is partly different from the nut 78.

The rod main body 26A has a solid structure. The rod main body 26A has a main shaft section 201 that is slidably inserted inside each of a rod guide 22 and a seal member 23 and extends outside the cylinder 2, and a holding shaft section 57A inside the cylinder 2A. The holding shaft section 57A has a smaller diameter than the main shaft section 201. A male screw 58A is formed on an outer circumference of an end section of the holding shaft section 57A which is on the opposite side of the main shaft section 201.

In the second embodiment, as illustrated in FIG. 11, a second piston 16A that is partly different from the second piston 16 is used. To be specific, a piston main body 111A that is partly different from the piston main body 111 is used. A passage forming hole section 125 is not formed in the piston main body 111A, and an insertion hole 126A having a constant diameter is formed in the piston main body 111A. The piston main body 111A fits the holding shaft section 57A of the piston rod 21A with the insertion hole 126A.

One regulating member 61, one abutting disc 62, one disc 63, a disc valve 64 made up of a plurality of discs, a first piston 15, a disc valve 65 made up of a plurality of discs, one disc 66, and one abutting disc 67, all of which are the same as in the first embodiment, are mounted on the holding shaft section 57A in this order and in addition, one regulating member 68A whose thickness is different from that of the first embodiment is mounted on the holding shaft section 57A. Further, one abutting disc 69, one disc 70, and a disc valve 71 made up of a plurality of discs, all of which are the same as in the first embodiment, are mounted on the holding shaft section 57A in this order and in addition, a second piston 16A and a disc 72A that is different from the passage forming disc 72 of the first embodiment in that passage groove 131 is not formed are mounted on the holding shaft section 57A in this order. Further, a plurality of discs 73, a disc valve 74 made up of a plurality of discs, one disc 75, one abutting disc 76, and one regulating member 77, all of which are the same as in the first embodiment, are mounted on the holding shaft section 57A in this order. These members mounted on the holding shaft section 57A are sandwich by the general-purpose nut 78A screwed to the male screw 58A without a small diameter hole section 137 and an end face of the main shaft section 201 which is close to the holding shaft section 57A. The stopper 35 of the first embodiment is not provided.

The axial groove 200 of the inner cylinder 5A has a length that can cross both of the first piston 15 and the second piston 16 in the axial direction at the same time. That is, the axial groove 200 extends to be longer than an axial length between the first piston 15 and the second piston 16 (a maximum distance between sliding members 96 and 112).

In a state in which the entire axial groove 200 is located at a side of the first piston 15 which is opposite to the second piston 16 and in a state in which the entire axial groove 200 is located at a side of the second piston 16 which is opposite to the first piston 15, the axial groove 200 does not cross both the first piston 15 and the second piston 16 in the axial direction, and does not allow all of an upper chamber 18, a middle chamber 19, and a lower chamber 20 to communicate with one another. In a state in which the axial groove 200 does not cross only the first piston 15 in the axial direction, the axial groove 200 allows the upper chamber 18 and the middle chamber 19 to communicate with each other with a wall passage (a second passage) 202 inside the first piston 15, but does not allow the middle chamber 19 and the lower chamber 20 to communicate with each other. In a state in which the axial groove 200 crosses only the second piston 16 in the axial direction, the axial groove 200 allows the middle chamber 19 and the lower chamber 20 to communicate with each other with the wall passage 202 of the second piston 16, but does not allow the upper chamber 18 and the middle chamber 19 to communicate with each other. In the state in which the axial groove 200 crosses both the first piston 15 and the second piston 16 in the axial direction at the same time, the axial groove 200 allows all of the upper chamber 18, the middle chamber 19, and the lower chamber 20 to communicate with one another with the wall passage 202 of the first piston 15 and the second piston 16. Therefore, in addition to passages 101, 102, 116 and 117, the wall passage 202 allows the upper chamber 18, the middle chamber 19, and the lower chamber 20 to communicate with one another.

Thereby, the first piston 15 and the axial groove 200 constitute a first adjustment section 171A that is provided with respect to the wall passage 202 and adjusts a flow passage area of oil between the upper chamber 18 and the middle chamber 19 depending on positions of the first piston 15 and the second piston 16. The second piston 16 and the axial groove 200 constitute a second adjustment section 172A that is provided with respect to the wall passage 202 and adjusts a flow passage area of oil between the middle chamber 19 and the lower chamber 20 depending on the positions of the first piston 15 and the second piston 16. In other words, the flow passage areas of the first adjustment section 171A and the second adjustment section 172A are adjusted by the axial groove 200 that is partly formed in the inner circumference of the inner cylinder 5 of the cylinder 2.

In the shock absorber 1A, when stroke positions of the first piston 15 and the second piston 16 are within a first given range from S4 to S5 that includes a neutral position (a position of 1G (a position at which a vehicle body stopped at a horizontal position is supported)) and is shown in FIG. 5(a), the axial groove 200 crosses both the first piston 15 and the second piston 16 in the axial direction at the same time, and allows the upper chamber 18, the middle chamber 19, and the lower chamber 20 to communicate with one another using the flow passage area of the wall passage 202. In other words, the first given range from S4 to S5 is a range regulated by the axial groove 200. In the first given range from S4 to S5, the flow passage area of the wall passage 202 surrounded by the first piston 15 and the axial groove 200 of the first adjustment section 171A and the flow passage area of the wall passage 202 surrounded by the second piston 16 and the axial groove 200 of the second adjustment section 172A have the same maximum values as represented by the solid lines U1 and U2 of FIG. 5(a), and the communication between the upper chamber 18 and the lower chamber 20 is maintained with flow passage area of the wall passage 202.

When the first piston 15 and the second piston 16 are within the first given range from S4 to S5, the oil of the upper chamber 18 flows to the lower chamber 20 via the wall passage 202 in an extension stroke in which the first piston 15 and the second piston 16 move to the upper chamber 18 side. Therefore, as represented by the solid line V1 of FIG. 5(b), a damping force enters into a soft state.

When the first piston 15 and the second piston 16 are within the first given range from S4 to S5, the oil of the lower chamber 20 flows to the upper chamber 18 via the wall passage 202 in a compression stroke in which the first piston 15 and the second piston 16 move to the lower chamber 20 side. Therefore, as represented by the broken line V2 of FIG. 5(b), the damping force enters into a soft state.

In the shock absorber 1A, when the stroke positions of the first piston 15 and the second piston 16 exceed the first given range from S4 to S5 and are within a second given range from S6 to S7 that is shown in FIG. 5(a) at a maximum length side at which the shock absorber 1 is set to a maximum length, the first piston 15 of the first adjustment section 171A interrupts the communication between the upper chamber 18 and the middle chamber 19 due to the wall passage 202 so that the flow passage area is made to the minimum value as represented by the solid line U1 of FIG. 5(a), and the first piston 15 of the second adjustment section 172A communicates between the middle chamber 19 and the lower chamber 20 due to the wall passage 202 so that the flow passage area is made to the maximum value as represented by the broken line U2 of FIG. 5(a).

When the first piston 15 and the second piston 16 are within the second given range from S6 to S7, the first adjustment section 171A interrupts the communication between the upper chamber 18 and the middle chamber 19 due to the wall passage 202 in the extension stroke in which the first piston 15 and the second piston 16 move to the upper chamber 18 side. For this reason, entry of the oil of the upper chamber 18 into the wall passage 202 is restricted, the oil passes through the passages 102 of the first piston 15, and flows to the middle chamber 19 by opening the extension-side damping valve 104 having a soft damping force property. Since the second adjustment section 172A communicates between the middle chamber 19 and the lower chamber 20 with the wall passage 202, the oil of the middle chamber 19 flows from the middle chamber 19 to the lower chamber 20 via the wall passage 202. Therefore, as represented by the solid line V1 of FIG. 5(b), the damping force is maintained in a soft state while becoming a slightly harder state than the first given range from S4 to S5.

When the first piston 15 and the second piston 16 are within the second given range from S6 to S7, the second adjustment section 172A communicates between the middle chamber 19 and the lower chamber 20 due to the wall passage 202 in the compression stroke in which the first piston 15 and the second piston 16 move to the lower chamber 20 side, and the first adjustment section 171A interrupts the communication between the upper chamber 18 and the middle chamber 19 due to the wall passage 202. For this reason, the oil of the lower chamber 20 flows to the middle chamber 19 side via the wall passage 202, passes the passages 101 of the first piston 15, and flows to the upper chamber 18 by opening the compression-side damping valve 103 having a hard damping force property. Therefore, as represented by the broken line V2 of FIG. 5(b), the damping force enters into a harder state than the first given range from S4 to S5 and a third given range from S2 to S3 (to be described below).

In the shock absorber 1A, when the stroke positions of the first piston 15 and the second piston 16 exceed the first given range from S4 to S5 and are within the third given range from S2 to S3 that is shown in FIG. 5(a) at a minimum length side at which the shock absorber 1A is set to a minimum length, the first adjustment section 171A communicates between the upper chamber 18 and the middle chamber 19 due to the wall passage 202 so that the flow passage area is made to the maximum value as represented by the solid line U1 of FIG. 5(a), and the second adjustment section 172A interrupts the communication between the middle chamber 19 and the lower chamber 20 due to the wall passage 202 so that the flow passage area is made to the minimum value as represented by the broken line U2 of FIG. 5(a).

When the first piston 15 and the second piston 16 are within the third given range from S2 to S3, the first adjustment section 171A communicates between the upper chamber 18 and the middle chamber 19 due to the wall passage 202 in the extension stroke in which the first piston 15 and the second piston 16 move to the upper chamber 18 side, and the second adjustment section 172A interrupts the communication between the middle chamber 19 and the lower chamber 20 with the wall passage 202. For this reason, the oil of the upper chamber 18 is introduced to the middle chamber 19 via the wall passage 202, and flows to the lower chamber 20 by opening the extension-side damping valve 119 having a hard damping force property. Therefore, as represented by the solid line V1 of FIG. 5(b), the damping force enters into a harder state than the second given range from S6 to S7.

When the first piston 15 and the second piston 16 are within the third given range from S2 to S3, the second adjustment section 172A interrupts the communication between the middle chamber 19 and the lower chamber 20 due to the wall passage 202 in the compression stroke in which the first piston 15 and the second piston 16 move to the lower chamber 20 side. For this reason, the oil of the lower chamber 20 passes the passages 116 of the second piston 16, and flows to the middle chamber 19 by opening the compression-side damping valve 118 having a soft damping force property. Since the first adjustment section 171A communicates between the upper chamber 18 and the middle chamber 19 with the wall passage 202, the oil of the middle chamber 19 flows from the upper chamber 18 via the wall passage 202. Therefore, as represented by the broken line V2 of FIG. 5(b), the damping force is maintained in a soft state while becoming a slightly harder state than the first given range from S4 to S5.

In the shock absorber 1A, when the stroke positions of the first piston 15 and the second piston 16 exceed the second given range from S6 to S7 and are within a fourth given range from S8 to S9 up to a full extension position S9 at the minimum length side, the first adjustment section 171A interrupts the communication between the upper chamber 18 and the middle chamber 19 due to the wall passage 202 so that the flow passage area is made to the minimum value as represented by the solid line U1 of FIG. 5(a), and the second adjustment section 172A interrupts the communication between the middle chamber 19 and the lower chamber 20 due to the wall passage 202 so that the flow passage area is made to the minimum value as represented by the broken line U2 of FIG. 5(a).

When the first piston 15 and the second piston 16 are within the third given range from S2 to S3, the first adjustment section 171A interrupts the communication between the upper chamber 18 and the middle chamber 19 due to the wall passage 202 in the extension stroke in which the first piston 15 and the second piston 16 move to the upper chamber 18 side, and the second adjustment section 172A interrupts the communication between the middle chamber 19 and the lower chamber 20 due to the wall passage 202. For this reason, the oil of the upper chamber 18 passes the passages 102, flows to the middle chamber 19 by opening the extension-side damping valve 104 having a soft damping force property, passes the passages 117, and flows to the lower chamber 20 by opening the extension-side damping valve 119 having a hard damping force property. Therefore, as represented by the solid line V1 of FIG. 5(b), the damping force enters into a hard state like the third given range from S2 to S3. Thereby, the damping force during the full extension enters into a hard state, and the suppression of abnormal noises and the improvement of riding comfort can be ensured.

When the first piston 15 and the second piston 16 are within the fourth given range from S8 to S9, the first adjustment section 171A interrupts the communication between the upper chamber 18 and the middle chamber 19 due to the wall passage 202 in the compression stroke in which the first piston 15 and the second piston 16 move to the lower chamber 20 side, and the second adjustment section 172A interrupts the communication between the middle chamber 19 and the lower chamber 20 due to the wall passage 202. For this reason, the oil of the lower chamber 20 passes the passages 116, flows to the middle chamber 19 by opening the compression-side damping valve 118 having a soft damping force property, passes the passages 101, and flows to the upper chamber 18 by opening the compression-side damping valve 103 having a hard damping force property. Therefore, as represented by the broken line V2 of FIG. 5(b), the damping force enters into a hard state like the second given range from S6 to S7.

In the shock absorber 1A, when the stroke positions of the first piston 15 and the second piston 16 exceed the third given range from S2 to S3 and are within a fifth given range from S0 to S1 up to a full compression position S0 at the minimum length side, the first adjustment section 171A interrupts the communication between the upper chamber 18 and the middle chamber 19 due to the wall passage 202 so that the flow passage area is made to the minimum value as represented by the solid line U1 of FIG. 5(a), and the second adjustment section 172A interrupts the communication between the middle chamber 19 and the lower chamber 20 due to the wall passage 202 so that the flow passage area is made to the minimum value as represented by the broken line U2 of FIG. 5(a).

When the first piston 15 and the second piston 16 are within the fifth given range from S0 to S1, the first adjustment section 171A interrupts the communication between the upper chamber 18 and the middle chamber 19 due to the wall passage 202 in the extension stroke in which the first piston 15 and the second piston 16 move to the upper chamber 18 side, and the second adjustment section 172A interrupts the communication between the middle chamber 19 and the lower chamber 20 due to the wall passage 202. For this reason, the oil of the upper chamber 18 passes the passages 102, flows to the middle chamber 19 by opening the extension-side damping valve 104 having a soft damping force property, passes the passages 117, and flows to the lower chamber 20 by opening the extension-side damping valve 119 having a hard damping force property. Therefore, as represented by the solid line V1 of FIG. 5(b), the damping force enters into a hard state like the third given range from S2 to S3.

When the first piston 15 and the second piston 16 are within the fifth given range from S0 to S1, the first adjustment section 171A interrupts the communication between the upper chamber 18 and the middle chamber 19 due to the wall passage 202 in the compression stroke in which the first piston 15 and the second piston 16 move to the lower chamber 20 side, and the second adjustment section 172A interrupts the communication between the middle chamber 19 and the lower chamber 20 due to the wall passage 202. For this reason, the oil of the lower chamber 20 passes the passages 116, flows to the middle chamber 19 by opening the compression-side damping valve 118 having a soft damping force property, passes the passages 101, and flows to the upper chamber 18 by opening the compression-side damping valve 103 having a hard damping force property. Therefore, as represented by the broken line V2 of FIG. 5(b), the damping force enters into a hard state like the second given range from S6 to S7, and the suppression of abnormal noises and the improvement of riding comfort can be ensured.

That is, the first adjustment section 171A and the second adjustment section 172A constitute a position-based state changing device 175A that changes a state of the wall passage 202 depending on positions of the first piston 15 and the second piston 16. The position-based state changing device 175A changes the state of the passage to the state in which the upper chamber 18 and the lower chamber 20 communicate with each other via the middle chamber 19 with a maximum flow passage area, the state in which the upper chamber 18 and the middle chamber 19 communicate with each other with a maximum flow passage area and the communication between the upper chamber 18 and the middle chamber 19 and the communication between the upper chamber 18 and the lower chamber 20 are interrupted, the state in which the lower chamber 20 and the middle chamber 19 communicate with each other with a maximum flow passage area and the communication between the lower chamber 20 and the middle chamber 19 and the communication between the lower chamber 20 and the upper chamber 18 are interrupted, and the state in which all the communications between the upper chamber 18, the middle chamber 19, and the lower chamber 20 are interrupted depending the positions of the first piston 15 and the second piston 16.

Thereby, in the shock absorber 1A, when the first piston 15 and the second piston 16 are within the first given range from S4 to S5 including the neutral position, the damping forces of both the movement in the extending direction and the movement in the compressing direction enter into the soft state. In the shock absorber 1A, when the first piston 15 and the second piston 16 are within the second given range from S6 to S7 at the maximum length side, the damping force of the movement in the extending direction enters into the soft state, and the damping force of the movement in the compressing direction enters into the hard state. In the shock absorber 1A, when the first piston 15 and the second piston 16 are within the third given range from S2 to S3 at the minimum length side, the damping force of the movement in the extending direction enters into the hard state, and the damping force of the movement in the compressing direction enters into the soft state. Further, in the shock absorber 1A, when the first piston 15 and the second piston 16 are within the fourth given range from S8 to S9 at the maximum length side and within the fifth given range from S0 to S1 at the minimum length side, the damping forces of the movement in the extending direction and the movement in the compressing direction enter into the hard state together. That is, the shock absorber 1A has inversion-type position-sensitive damping force change characteristics in which a relation between the hard state and the soft state of the movement in the extending direction and the movement in the compressing direction is inverted within the second given range from S6 to S7 at the maximum length side and the third given range from S2 to S3 at the minimum length side.

In the second embodiment, a relation between a length of the axial groove 200 and a length between the first piston 15 constituting the first adjustment section 171A and the second piston 16 constituting the second adjustment section 172A may be changed such that up to the full extension position S9, the first adjustment section 171A may interrupt the communication between the upper chamber 18 and the middle chamber 19, and the second adjustment section 172A may allow the middle chamber 19 and the lower chamber 20 to communicate with each other. That is, the second given range from S6 to S7 meeting these relations may extend up to the full extension position S9. Likewise, up to the full compression position S0, the first adjustment section 171A may allow the upper chamber 18 and the middle chamber 19 to communicate with each other, and the second adjustment section 172A may interrupt the communication between the middle chamber 19 and the lower chamber 20. The third given range from S2 to S3 meeting these relations may extend up to the full compression position S0.

Among these changes, the change of only any one of the extension side and compression side may be adopted. Preferably, in at least any one of the case in which the first piston 15 and the second piston 16 exceed the second given range from S6 to S7 and are located at the maximum length side and the case in which the first piston 15 and the second piston 16 exceed the third given range from S2 to S3 and are located at the minimum length side, the flow passage areas of the first adjustment section 171A and the second adjustment section 172A may be set to be reduced together. More preferably, in both the cases, the flow passage areas of the first adjustment section 171A and the second adjustment section 172A may be set to be reduced together.

According to the second embodiment described above, since the axial groove 200 that extends to be longer than the axial length between the first adjustment section 171A and the second adjustment section 172A and regulates the first given range from S4 to S5 may be formed, the shock absorber 1A can be made in a simple structure.

In the first and second embodiments described above, the middle chamber 19 may be provided inside the first piston 15 and the second piston 16 without any one of the first piston 15 and the second piston 16 sliding in the inner cylinder 5. In addition, a tubular body joining the first piston 15 and the second piston 16 may be provided at outer circumference sides of the first piston 15 and the second piston 16, and the middle chamber may be formed inside the tubular body.

The damping force properties of the compression-side damping valves 103 and 118 and the extension-side damping valves 104 and 119 may be all made different, and at least two thereof may be the same damping force properties. For example, the damping force properties may be changed in such a manner that the two properties are set as a medium property between soft and hard properties, one remaining property is set as a soft property, and the other remaining property is set as a hard property.

The second embodiment is also not limited to the double cylinder shock absorber, and may be applied to a single cylinder shock absorber.

The shock absorber of the present embodiment is a shock absorber having a cylinder in which a working fluid is encapsulated, a piston that is provided in an inside of the cylinder and divides the inside of the cylinder into an upper chamber and a lower chamber, and a piston rod that is connected to the pistons and extends outside the cylinder, and includes a middle chamber that is formed by the piston, a first damping-force generating device that is provided between the upper chamber and the middle chamber and generates a damping force, a second damping-force generating device that is provided between the lower chamber and the middle chamber and generates a damping force, and a position-based state changing device that changes a state of a passage to a state in which the upper chamber and the lower chamber communicate with each other, a state in which the upper chamber and the middle chamber communicate with each other, or a state in which the lower chamber and the middle chamber communicate with each other depending on the position of the piston. Thereby, a degree of freedom in setting the damping force can be enhanced.

The shock absorber includes: a cylinder in which a working fluid is encapsulated; first and second pistons, at least one of which is slidably provided in an inside of the cylinder and which divide the inside of the cylinder into an upper chamber, a middle chamber, and a lower chamber; a piston rod connected to the first and second pistons and extending outside the cylinder; a first passage that is provided in the first and second pistons and communicates between the upper chamber and the middle chamber and between the middle chamber and the lower chamber such that the working fluid flows; extension-side and compression-side damping valves that are provided on the first and second pistons, restrict a flow of the working fluid flowing along the first passage by movement of the first and second pistons, and generate damping forces; a second passage that communicates the upper chamber, the middle chamber, and the lower chamber with one another aside from the first passage; a first adjustment section that is provided with respect to the second passage and adjusts a flow passage area of the working fluid between the upper chamber and the middle chamber depending on positions of the first and second pistons; and a second adjustment section that is provided with respect to the second passage and adjusts a flow passage area of the working fluid between the lower chamber and the middle chamber depending on the positions of the first and second pistons. The flow passage areas of the first and second adjustment sections are set such that: the flow passage area of the first adjustment section and the flow passage area of the second adjustment section are increased together when the first piston and the second piston are within a first given range including a neutral position; the flow passage area of the first adjustment section is reduced, and the flow passage area of the second adjustment section is increased when the first piston and the second piston exceed the first given range and are within a second given range at a maximum length side; and the flow passage area of the first adjustment section is increased, and the flow passage area of the second adjustment section is reduced when the first piston and the second piston exceed the first given range and are within a third given range at a minimum length side. Thereby, a degree of freedom in setting the damping force can be enhanced.

The extension-side damping valve of the first piston and the extension-side damping valve of the second piston is set such that, when the first piston and the second piston move in an extending direction, the damping force generated by the extension-side damping valve located upstream is smaller than the damping force generated by the extension-side damping valve located downstream. The compression-side damping valve of the first piston and the compression-side damping valve of the second piston is set such that, when the first piston and the second piston move in a compressing direction, the damping force generated by the compression-side damping valve located upstream is smaller than the damping force generated by the compression-side damping valve located downstream. Thereby, the damping force can be made soft by the flow of the oil passing through the extension-side damping valve in the extension stroke when the first and second pistons are within the second given range. The damping force can be made hard by the flow of the oil passing through the extension-side damping valve in the extension stroke when the first and second pistons are within the third given range. The damping force can be made soft by the flow of the oil passing through the compression-side damping valve in the compression stroke when the first and second pistons are within the third given range. The damping force can be made hard by the flow of the oil passing through the compression-side damping valve in the compression stroke when the first and second pistons are within the second given range.

In at least one of the case in which the first piston and the second piston exceed the second given range and are located at the maximum length side and the case in which the first piston and the second piston exceed the third given range and are located at the minimum length side, the flow passage area of the first adjustment section and the flow passage area of the second adjustment section are set to be reduced together. Thereby, the damping forces during the full extension and full compression can be increased, and the suppression of abnormal noises and the improvement of riding comfort can be ensured.

The flow passage area of the first adjustment section and the flow passage area of the second adjustment section are adjusted by a metering pin. The metering pin has a reduced diameter section that extends to be longer than an axial length between the first adjustment section and the second adjustment section, and regulates the first given range. Thereby, the shock absorber can be made in a simple structure.

The flow passage areas of the first and second adjustment sections are adjusted by an axial groove that is partly formed on an inner circumference of the cylinder. The axial groove extends to be longer than the axial length between the first adjustment section and the second adjustment section, and regulates the first given range. Thereby, the shock absorber can be made in a simple structure.

INDUSTRIAL APPLICABILITY

According to the shock absorber, a degree of freedom in setting a damping force can be enhanced.

[Reference Signs List]

| | |
|---|---|
| 1, 1A | Shock absorber |
| 2, 2A | Cylinder |
| 15 | First piston |
| 16 | Second piston |
| 18 | Upper chamber |
| 19 | Middle chamber |
| 20 | Lower chamber |
| 21, 21A | Piston rod |
| 31 | Metering pin |
| 32 | Intra-rod passage (second passage) |
| 101, 102, 116, 117 | Passage (first passage) |
| 103, 118 | Compression-side damping valve |
| 104, 119 | Extension-side damping valve |
| 105 | First damping-force generating device |
| 120 | Second damping-force generating device |
| 132 | Communication passage (second passage) |
| 171, 171A | First adjustment section |
| 172, 172A | Second adjustment section |
| 175, 175A | Position-based state changing device |
| 200 | Axial groove |
| 202 | Wall passage (second passage) |

The invention claimed is:

1. A shock absorber comprising:
a cylinder in which a working fluid is encapsulated;
first and second pistons, at least one of which is slidably provided in an inside of the cylinder, and which divide the inside of the cylinder into an upper chamber, a middle chamber, and a lower chamber;
a piston rod connected to the first and second pistons and configured to extend outside the cylinder;
a first passage provided in the first and second pistons and configured to communicate between the upper chamber and the middle chamber and between the middle chamber and the lower chamber such that the working fluid flows;
a first extension-side damping valve provided on the first piston at a side of the first piston facing the middle chamber, configured to restrict a flow of the working fluid flowing along the first passage by movement of the first and second pistons, and configured to generate a damping force;
a second extension-side damping valve provided on the second piston at a side of the second piston facing the lower chamber, configured to restrict a flow of the working fluid flowing along the first passage by movement of the first and second pistons, and configured to generate a damping force;
a first compression-side damping valve provided on the first piston at a side of the first piston facing the upper chamber, configured to restrict a flow of the working fluid flowing along the first passage by movement of the first and second pistons, and configured to generate a damping force;
a second compression-side damping valve provided on the second piston at a side of the second piston facing the middle chamber, configured to restrict a flow of the working fluid flowing along the first passage by movement of the first and second pistons, and configured to generate a damping force;
a second passage configured to allow the upper chamber, the middle chamber, and the lower chamber to communicate therethrough in addition to the first passage;
a first adjustment section provided on the second passage and configured to adjust a first flow passage area of the working fluid between the upper chamber and the middle chamber depending on positions of the first and second pistons; and
a second adjustment section that is provided on the second passage and configured to adjust a second flow passage area of the working fluid between the lower chamber and the middle chamber depending on the positions of the first and second pistons,
wherein:
in an extension stroke in which the first piston and the second piston are moved in an extending direction in which the piston rod protrudes from the cylinder, the damping force generated by the first extension-side damping valve that is provided on the first piston is smaller than the damping force generated by the second extension-side damping valve that is provided on the second piston;
in a compression stroke in which the first piston and the second piston are moved in a compressing direction in which the piston rod enters the cylinder, the damping force generated by the second compression-side damping valve that is provided on the second piston is smaller than the damping force generated by the first compression-side damping valve that is provided on the first piston;
by increasing the first flow passage area of the first adjustment section and the second flow passage area of the second adjustment section together, the damping force of the extension stroke in which the first piston and the second piston are moved in the extending direction is made soft, and the damping force of the compression stroke in which the first piston and the second piston are moved in the compressing direction is made soft when the first piston and the second piston are within a first predetermined range including a neutral position;
by reducing the first flow passage area of the first adjustment section and increasing the second flow passage area of the second adjustment section, the damping force of the extension stroke in which the first piston and the second piston are moved in the extending direction is made soft, and the damping force of the compression stroke in which the first piston and the second piston are moved in the compressing direction is made hard when the first piston and the second piston exceed the first predetermined range and are within a second predetermined range at a maximum length side at which the shock absorber is set to a maximum length;
by increasing the first flow passage area of the first adjustment section and reducing the second flow passage area of the second adjustment section, the damping force of the extension stroke in which the first piston and the second piston are moved in the extending direction is made hard, and the damping force of the compression stroke in which the first piston and the second piston are moved in the compressing direction is made soft when the first piston and the second piston exceed the first predetermined range and are within a third predetermined range at a minimum length side at which the shock absorber is set to a minimum length;
a first small diameter hole section and a second small diameter hole section are provided on the second passage;
the first small diameter hole section and a metering pin constitute the first adjustment section;
the second small diameter hole section and the metering pin constitute the second adjustment section;
the first flow passage area of the first adjustment section and the second flow passage area of the second adjustment section are adjusted by the metering pin;

the metering pin has a reduced diameter section that extends to be longer than an axial length between the first adjustment section and the second adjustment section, and regulates the first predetermined range; and the first predetermined range is a range in which both the first small diameter hole section and the second small diameter hole section simultaneously overlap in an axial position with the reduced diameter section of the metering pin.

2. The shock absorber according to claim 1, wherein, in at least one of a case in which the first piston and the second piston exceed the second predetermined range and are located at the maximum length side at which the shock absorber is set to the maximum length and a case in which the first piston and the second piston exceed the third predetermined range and are located at the minimum length side at which the shock absorber is set to the minimum length, the first flow passage area of the first adjustment section and the second flow passage area of the second adjustment section are set to be reduced together.

3. The shock absorber according to claim 2, wherein:
- a first small diameter hole section and a second small diameter hole section are provided on the second passage;
- the first small diameter hole section and a metering pin constitute the first adjustment section;
- the second small diameter hole section and the metering pin constitute the second adjustment section;
- the first flow passage area of the first adjustment section and the second flow passage area of the second adjustment section are adjusted by the metering pin;
- the metering pin has a reduced diameter section that extends to be longer than an axial length between the first adjustment section and the second adjustment section, and regulates the first predetermined range; and
- the first predetermined range is a range in which both the first small diameter hole section and the second small diameter hole section simultaneously overlap in an axial position with the reduced diameter section of the metering pin.

4. The shock absorber according to claim 1, wherein the second predetermined range is a range in which the first small diameter hole section overlaps in an axial position with a large diameter section of the metering pin, and the second small diameter hole section overlaps in an axial position with the reduced diameter section of the metering pin.

5. The shock absorber according to claim 4, wherein the third predetermined range is a range in which the first small diameter hole section overlaps in an axial position with the reduced diameter section of the metering pin, and the second small diameter hole section overlaps in an axial position with another large diameter section of the metering pin.

* * * * *